(12) United States Patent
Kondo et al.

(10) Patent No.: US 7,130,453 B2
(45) Date of Patent: Oct. 31, 2006

(54) EYE POSITION DETECTION METHOD AND DEVICE

(75) Inventors: Kenji Kondo, Hirakata (JP); Kenya Uomori, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 612 days.

(21) Appl. No.: 10/028,456

(22) Filed: Dec. 20, 2001

(65) Prior Publication Data

US 2003/0118217 A1    Jun. 26, 2003

(51) Int. Cl.
*G06K 9/00* (2006.01)
(52) U.S. Cl. .................. 382/117; 382/118; 382/209; 382/199; 382/274
(58) Field of Classification Search ........... 382/115, 382/117, 118, 209, 274, 199, 260, 263, 103; 351/200, 205, 211; 340/5.53, 5.83, 576; 348/78
See application file for complete search history.

(56) References Cited

U.S. PATENT DOCUMENTS

| | | | | |
|---|---|---|---|---|
| 5,642,431 | A * | 6/1997 | Poggio et al. ............... | 382/118 |
| 5,844,565 | A * | 12/1998 | Mizutani et al. ............ | 345/581 |
| 5,878,156 | A | 3/1999 | Okumura | |
| 5,905,807 | A * | 5/1999 | Kado et al. ................. | 382/118 |
| 5,995,639 | A * | 11/1999 | Kado et al. ................. | 382/118 |
| 6,035,054 | A * | 3/2000 | Odaka et al. ............... | 382/117 |
| 6,151,403 | A * | 11/2000 | Luo ........................... | 382/117 |
| 6,792,134 | B1 * | 9/2004 | Chen et al. ................. | 382/117 |

FOREIGN PATENT DOCUMENTS

| | | |
|---|---|---|
| EP | 0 735 509 A1 | 10/1996 |
| JP | 05-197793 | 8/1993 |
| JP | 08-185503 | 7/1996 |
| JP | 10-063850 | 3/1998 |
| JP | 10-154220 | 6/1998 |
| JP | 2000-123148 | 4/2000 |
| WO | WO 99/26126 | 5/1999 |

OTHER PUBLICATIONS

Eriksson, Martin and Papanikolopoulos, Nikolaos, P.; "Eye-Tracking for Detection of Driver Fatigue"; Artificial Intelligence, Robotics, and Vision Laboratory; Department of Computer Science, University of Minnesota, Minneapolis, MN; IEEE 1998; pp. 314-319.

European Search Report No. 01 13 0489; completed Jul. 30, 2002.

Fukui, Kazuhiro et al.; "Facial Feature Point Extraction Method Based on Combination of Shape Extraction and Pattern Matching;" The Transactions of the Institute of Electronics, Information and Communication Engineers; D-II vol. J80-D-II; No. 8; pp. 2170-2177; Aug. 1997; and a partial English translation thereof.

* cited by examiner

*Primary Examiner*—Andrew W. Johns
*Assistant Examiner*—John Strege
(74) *Attorney, Agent, or Firm*—Harness, Dickey & Pierce, P.L.C.

(57) ABSTRACT

The position of an eye is detectable with high precision from a face image of a person taken under near infrared illumination or the like. After pre-processing, the face image is subjected to brightness correction to increase the contrast between the sclera portion and iris portion of the eye. Brightness gradient vectors are calculated for the brightness-corrected image, and matching is performed between a brightness gradient image generated using the calculated brightness gradient vectors and an eye template. Further, matching with a pupil template is performed to correct the eye center position. Final positions of both eyes are then determined.

12 Claims, 21 Drawing Sheets

⟨S20 Determination of eye center position candidate⟩

<S30 Determination of eye position>

FIG. 9A  Under visible light
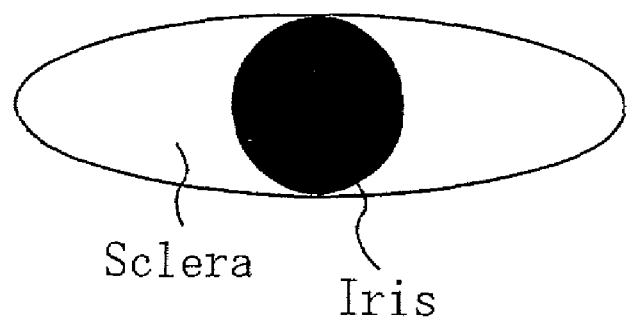
FIG. 9B  Under near infrared light
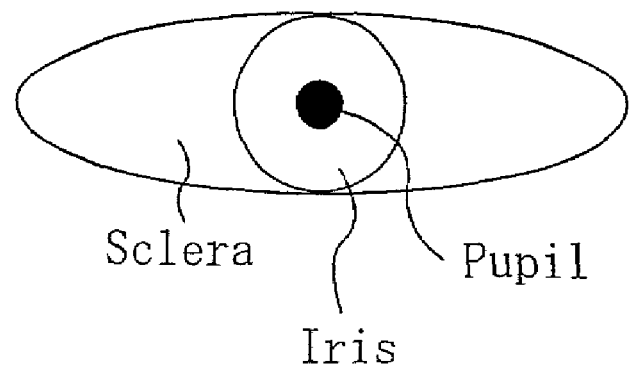

FIG. 10

<Sobel filter>

| -1 | 0 | 1 |
|----|---|---|
| -2 | 0 | 2 |
| -1 | 0 | 1 | x direction

| -1 | -2 | -1 |
|----|----|----|
| 0  | 0  | 0  |
| 1  | 2  | 1  | y direction

CI    CO

Image taken under visible light

Image taken under near infrared light x direction

FIG. 18

| -1 | -0.63 | 0 | 0.63 | 1 |
|---|---|---|---|---|
| -1.68 | -1.06 | 0 | 1.06 | 1.68 |
| -2 | -1.26 | 0 | 1.26 | 2 |
| -1.68 | -1.06 | 0 | 1.06 | 1.68 |
| -1 | -0.63 | 0 | 0.63 | 1 |

| -1 | -1.68 | -2 | -1.68 | -1 |
|---|---|---|---|---|
| -0.63 | -1.06 | -1.26 | -1.06 | -0.63 |
| 0 | 0 | 0 | 0 | 0 |
| 0.63 | 1.06 | 1.26 | 1.06 | 0.63 |
| 1 | 1.68 | 2 | 1.68 | 1 | x direction      y direction

Edge intensity
measuring point

Ratio of image size to
filter size

EYE POSITION DETECTION METHOD AND DEVICE

BACKGROUND OF THE INVENTION

The present invention relates to an image processing technology of detecting the position of an eye from a human face image for iris authentication and the like used for entrance/exit control and the like.

In recent years, the technology of personal authentication using iris recognition has been gradually brought into commercial use in association with entrance/exit control, automatic teller machine (ATM), and the like. As an example of such commercial use, conceived is a system of detecting the position of an eye from a human face image taken and performing iris recognition using an enlarged image of the detected eye position.

Techniques for detecting an eye from an image are disclosed in: (1) "Facial Feature Point Extraction Method Based on Combination of Shape Extraction and Pattern Matching", The Institute of Electronics, Information and Communication Engineers, Transactions D-II, Vol. J80-D-II, No. 8, pp. 2170–2177, (2) Japanese Patent No. 2973676, (3) Japanese Laid-Open Patent Publication No. 10-63850, (4) Japanese Laid-Open Patent Publication No. 12-123148, (5) Japanese Laid-Open Patent Publication No. 8-185503, (6) Japanese Laid-Open Patent Publication No. 10-154220, for example.

(1) and (2) above disclose techniques for detecting an eye from an image taken under visible light. Specifically, the technique in (1) extracts features of an eye and the like from a gray-scale image of a face using a separability filter, a filter capable of locating a portion the center of which has a small brightness value while the periphery having a large brightness value. The technique in (2) extracts features of an eye and the like by subjecting a gray-scale image of a face to edge extraction filtering and matching the resultant edge image with templates of face components made of edges.

(3) to (6) disclose techniques for detecting an eye from an image taken by near infrared photography. Specifically, the techniques in (3) and (4) locate an eye by focusing attention on a change in the brightness of the eye in the vertical direction (upper eyelid→iris→lower eyelid). The techniques in (5) and (6) locate an eye by use of reflection of illumination light. More specifically, the technique in (5) utilizes the fact that in the case of co-axial lightning (in which the optical axis of an illuminator coincides with that of a camera), the brightness of reflection from the retina is different from that of reflection from the surface of the cornea, the rim and lenses of eyeglasses, and the like. That is, the eye position is determined from the reflection from the retina by appropriately setting two types of binary threshold values. The technique in (6) focuses attention on a plurality of kinds of reflection including reflection from the cornea of an eye. A kind of reflection exhibiting a large change in brightness with time is recognized as disappearance of reflection from the cornea due to blinking, and based on this recognition, the position of the eye is determined.

In iris recognition systems using the techniques described above, the illumination used is preferably near infrared light rather than visible light. The reason is that, in near infrared illumination, the subject of a photograph, who does not recognize the near infrared light, is prevented from being dazzled with the light and thus less feels a psychological repulsion against being photographed.

However, in an eye image taken under near infrared light, unlike an eye image taken under visible light, the iris has high reflectance and therefore only the pupil looks dark. In this case, therefore, the brightness becomes higher as the position shifts in the order of the pupil, the iris, the sclera, and the skin. This means that the difference in brightness between the iris and the sclera of the eye image is small compared with that of the image taken under visible light. Therefore, detection of an eye will not be successful when the technique of using gray-scale values as disclosed in (1) and the technique of using edge information obtained from gray-scale values as disclosed in (2) are directly applied to an eye image taken under near infrared light. This has been confirmed by experiments performed by the present inventors.

In the techniques in (3) and (4), attention is focused on a change in the brightness of an eye in the vertical direction because the change in the brightness of the eye in the lateral direction is small in an image taken under near infrared light. However, the brightness change of light→dark→light in the vertical direction also occurs at positions of the face other than the eyes, such as the eyebrows, the nostrils, and spots. There is therefore a great possibility of detecting a position other than the eyes by mistake.

The technique in (5) requires a special illuminator for co-axial lightning. In addition, this technique will not work well when the position of reflection from the lens or the like overlaps the position of reflection from the retina. In the technique in (6), it is necessary to wait for the subject blinking to observe a change with time. Therefore, it takes a certain amount of time to detect the eye position. Moreover, if the subject moves during this waiting time, detection of the eye may fail.

SUMMARY OF THE INVENTION

An object of the present invention is providing a method for detecting the position of an eye from a face image, in which the eye position can be detected with high precision in a short time from an image of which the contrast between the iris portion and the sclera portion is low, such as an image taken under near infrared light, without using a special device such as a co-axial lightning device.

Concretely, the present invention is directed to a method for detecting an eye position from a face image including at least an eye area, including the steps of: performing brightness correction for part or the entire of the face image to increase the contrast between a sclera portion and an iris portion of the eye; calculating brightness gradient vectors for the brightness-corrected face image; and performing matching between a brightness gradient image generated using the calculated brightness gradient vectors and an eye template, wherein the eye position is detected based on the results of the matching.

According to the invention described above, brightness correction is performed for part or the entire of a face image including at least an eye area to increase the contrast between the sclera portion and iris portion of the eye. Brightness gradient vectors are calculated for the brightness-corrected face image, and matching is performed between a brightness gradient image generated using the brightness gradient vectors and an eye template. In other words, the contrast between the sclera portion and iris portion of the eye is stressed, thereby increasing the edge intensity between the sclera portion and the iris portion, before the matching for detection of the eye position. This enables high precision detection of the eye position by the matching between the brightness gradient image and the eye template.

In the eye position detection method of the invention described above, the brightness correction step preferably includes the steps of: calculating a brightness gradient for the face image; selecting a portion including an edge from the face image based on the calculated brightness gradient; and correcting the brightness using the selected portion of the face image.

Further, preferably, a correlation between an image size and a filter size, capable of intensifying an edge of the iris portion against the sclera portion is previously calculated, and the calculation of the brightness gradient in the brightness correction step is performed using a filter having a size determined to correspond to the size of the face image based on the calculated correlation. Alternatively, preferably, a correlation between an image size and a filter size, capable of intensifying an edge of the iris portion against the sclera portion is previously calculated, and the calculation of the brightness gradient in the brightness correction step is performed using a filter having a predetermined size and changing the size of the face image to correspond to the filter size based on the calculated correlation.

In the eye position detection method of the invention described above, the brightness correction step preferably includes the steps of: calculating an average brightness for part or the entire of the face image; and performing the brightness correction when the calculated average brightness is smaller than a predetermined value while performing no bright correction when it is equal to or greater than the predetermined value.

The brightness correction step may include the steps of: splitting an area of the face image subjected to the brightness correction into a plurality of partial areas; and performing the brightness correction for each of the partial areas.

The splitting of the area preferably includes splitting the area subjected to the brightness correction into right and left parts. Further, the splitting of the area preferably includes detecting the position of a nose from the area subjected to the brightness correction, and splitting the area subjected to the brightness correction into right and left parts with respect to the position of the nose.

Alternatively, the present invention is directed to a method for detecting an eye position from a face image including at least an eye area, including the steps of calculating brightness gradient vectors for the face image; performing matching between a brightness gradient image generated using the calculated brightness gradient vectors and an eye template; and detecting the eye position based on the results of the matching, wherein the eye template includes a plurality of points each having a brightness gradient vector, the points being placed on a curve corresponding to the boundary between an eyelid and an eyeball and on the periphery of an iris portion, and the points placed on the periphery of the iris portion are arranged in n concentric circles (n is an integer equal to or more than 2).

The invention described above proposes an eye template capable of absorbing a certain amount of variation in the size of the eyes of a face image. In the eye detection method using a conventional template, a plurality of templates having different sizes and the like are required to cope with an error in the detection of the face area, differences in the size and shape of the eyes among individuals, and the like, and this disadvantageously increases the time required for the matching.

According to the above invention, the points on the periphery of the iris portion are arranged in n concentric circles. Therefore, even if the eye size more or less varies, the eye template can meet such a variation, and thus high precision matching is possible.

Alternatively, the present invention is directed to a method for detecting an eye position from a face image including at least an eye area, including the steps of: calculating brightness gradient vectors for the face image; performing matching between a brightness gradient image generated using the calculated brightness gradient vectors and an eye template including a plurality of points each having a brightness gradient vector; and detecting the eye position based on the results of the matching, wherein in the matching, points on the brightness gradient image corresponding to pixels of the face image having a brightness value greater than a predetermined value are excluded from correlation value calculation for the matching.

The invention described above proposes a method capable of performing template matching efficiently even when reflection from an eyeglass or the like overlaps the eye to some extent. In the eye detection method using a conventional template, the matching tends to fail when reflection from an eyeglass or the like overlaps the eye.

According to the above invention, points on the brightness gradient image corresponding to pixels of the image having a brightness value greater than a predetermined value are excluded from correlation value calculation for matching. This means that a portion overlapped by reflection from an eyeglass, if any, is not included in the correlation value calculation. This enables further high precision matching of the eye position.

Alternatively, the present invention is directed to a method for detecting an eye position from a face image including at least an eye area, including the steps of: (1) calculating a first matching score by performing matching between the face image or an image obtained by converting the face image and an eye template; and (2) calculating a second matching score by performing matching between the face image or an image obtained by converting the face image and a pupil template, wherein the eye position is detected based on the first and second matching scores.

The invention described above proposes a method capable of detecting the iris center with high precision. In the conventional eye detection method using a template of the entire eye, the position highest in the entire correlation is determined as the eye detection position. This causes a problem that the iris center of the template does not necessarily agree with the actual iris center.

According to the above invention, matching using a pupil template is performed in addition to the matching using an eye template, and the eye position is detected based on matching scores obtained from the two types of matching. This improves the precision of locating the center position of the eye compared with that conventionally achieved.

Preferably, the eye position detection method of the invention described above further includes the step of (3) modifying the first matching score by considering the second matching score, wherein the eye position is detected using the modified first matching score.

In the eye position detection method of the invention described above, preferably, the step (1) is performed for an image obtained by reducing the face image, and the step (2) is performed for the original face image. Further, preferably, the step (1) includes the step of selecting a portion to be an eye position candidate based on the first matching score, and the step (2) performs the matching using the pupil template only for a region of the selected eye position candidate corresponding to an iris portion of the eye template and surroundings of the region.

According to another aspect of the invention, a device for detecting an eye position from a face image including at least an eye area is provided. The device includes: means for performing brightness correction for part or the entire of the face image to increase the contrast between a sclera portion and an iris portion of an eye; means for calculating brightness gradient vectors from the brightness-corrected face image; and performing matching between a brightness gradient image generated using the calculated brightness gradient vectors and an eye template, wherein the eye position is detected based on the results of the matching.

Alternatively, the present invention is directed to a device for detecting an eye position from a face image including at least an eye area. The device includes: means for calculating brightness gradient vectors from the face image; means for performing matching between a brightness gradient image generated using the calculated brightness gradient vectors and an eye template; and means for detecting the eye position based on the results of the matching, wherein the eye template includes a plurality of points each having a brightness gradient vector, the points being placed on a curve corresponding to the boundary between an eyelid and an eyeball and on the periphery of an iris portion, and the points placed on the periphery of the iris portion are arranged in n concentric circles (n is an integer equal to or more than 2).

Alternatively, the present invention is directed to a device for detecting an eye position from a face image including at least an eye area. The device includes: means for calculating brightness gradient vectors from the face image; means for performing matching between a brightness gradient image generated using the calculated brightness gradient vectors and an eye template including a plurality of points each having a brightness gradient vector; and means for detecting the eye position based on the results of the matching, wherein in the matching, points on the brightness gradient image corresponding to pixels of the face image having a brightness value greater than a predetermined value are excluded from correlation value calculation for the matching.

Alternatively, the present invention is directed to a device for detecting an eye position from a face image including at least an eye area. The device includes: means for calculating a first matching score by performing matching between the face image or an image obtained by converting the face image and an eye template; and means for calculating a second matching score by performing matching between the face image or an image obtained by converting the face image and a pupil template, wherein the eye position is detected based on the first and second matching scores.

BRIEF DESCRIPTION OF THE DRAWINGS

FIGS. 9A and 9B are diagrammatic views of examples of images of an eye taken under visible light (9A) and under near infrared light (9B).

FIG. 10 is a view showing a 3×3 Sobel filter.

FIG. 18 is a view showing 5×5 filter coefficients.

DESCRIPTION OF THE PREFERRED EMBODIMENTS

Hereinafter, a preferred embodiment of the present invention will be described with reference to the accompanying drawings.

Figure 1:
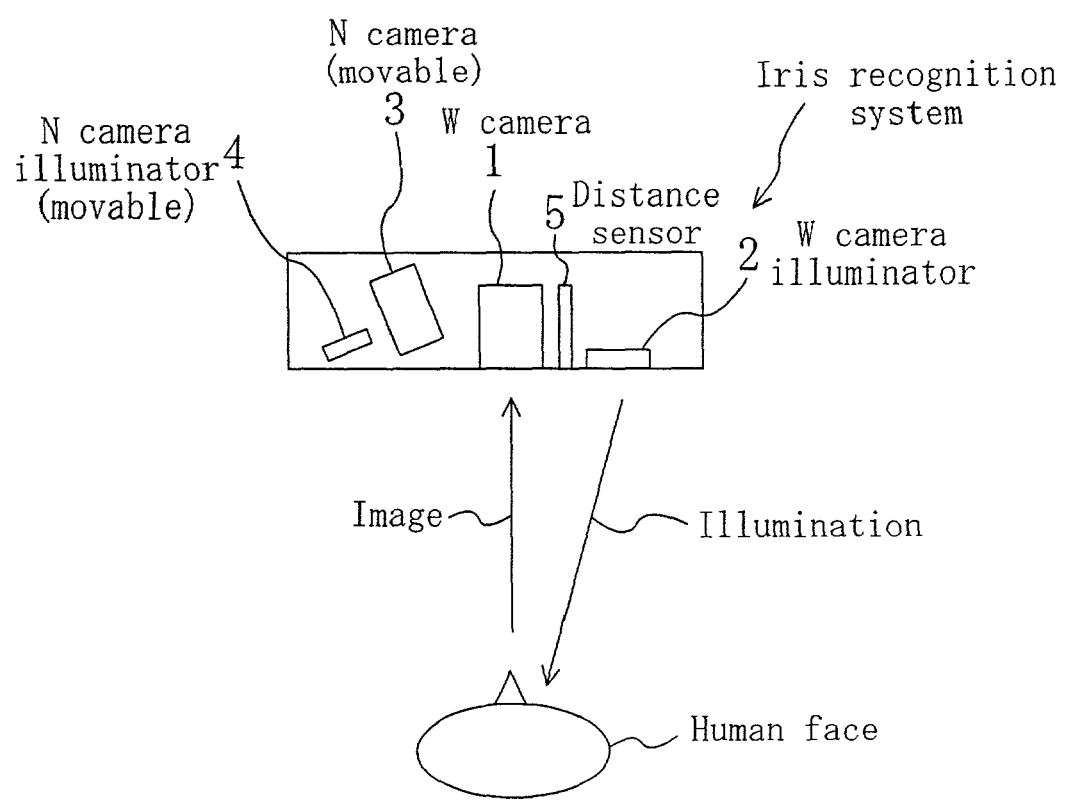
FIG. 1 is a view of a schematic configuration of an iris recognition system using the eye position detection according to the present invention.

FIG. 1 is a view of a schematic configuration of an iris recognition system using the eye position detection according to the present invention. The iris recognition system of FIG. 1 has a 2-camera structure composed of a wide field of view (W) camera 1 and a narrow field of view (N) camera 3. The W camera 1 takes an image including at least an eye. A distance sensor 5 measures the distance from the eye. The N camera 3, which receives the position of the eye determined from the image taken by the W camera 1 and the distance from 10 the eye measured by the distance sensor 5, takes an enlarged image of the iris of the eye.

Figure 2:
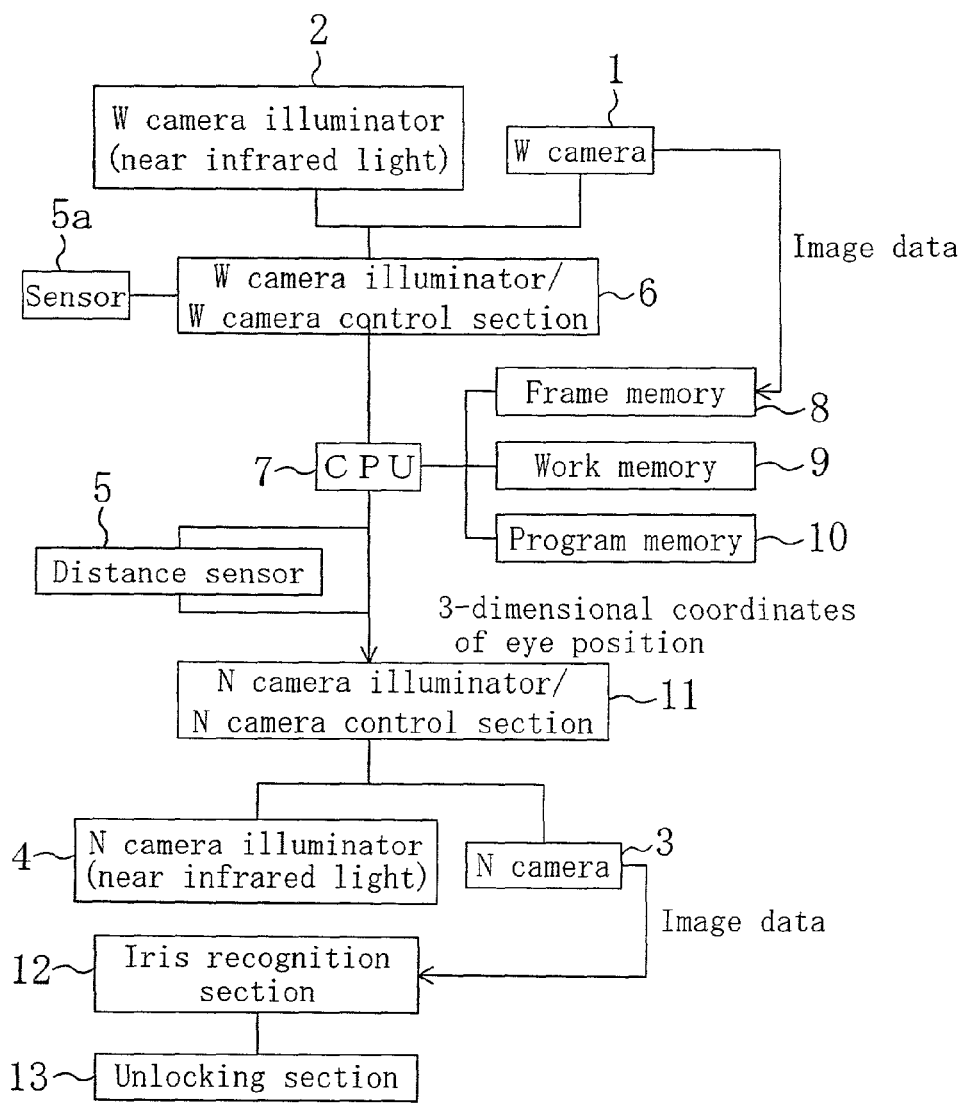
FIG. 2 is a block diagram of an entrance/exit control system using the iris recognition system of FIG. 1.

FIG. 2 is a block diagram of an entrance/exit control system as an example of a system using the iris recognition system shown in FIG. 1. Referring to FIG. 2, the W camera 1 and a W camera illuminator 2 are controlled by a W camera illuminator/W camera control section 6, while the N camera 3 and a N camera illuminator 4 are controlled by a N camera illuminator/N camera control section 11. The W camera illuminator/W camera control section 6 and the N camera illuminator/N camera control section 11 are controlled by a CPU 7. The CPU 7 executes processing programs stored in a program memory 10.

Figure 3:
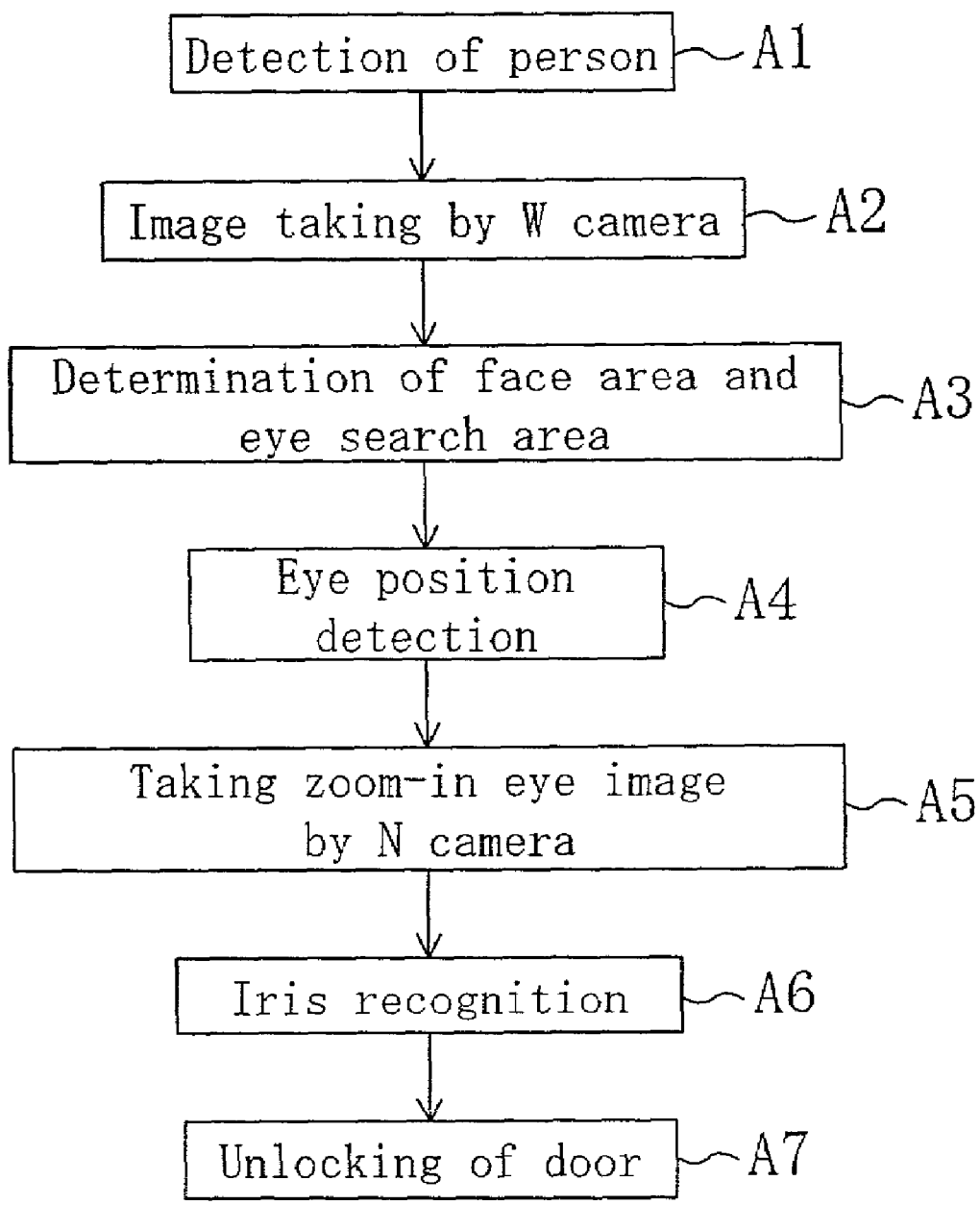
FIG. 3 is a flowchart of the operation of the entrance/exit control system of FIG. 2.

FIG. 3 is a flowchart of the operation of the entrance/exit control system of FIG. 2. Referring to FIG. 3, the operation of the entrance/exit control system will be described.

When a person stands in front of the entrance/exit control system, a sensor 5*a* senses the person and sends a sensing signal to the W camera illuminator/w camera control section 6 (A1). The W camera illuminator/w camera control section 6 sends a photographing signal and an illumination start signal synchronizing with each other to the W camera 1 and the W camera illuminator 2, respectively. The W camera 1 then takes an image including at least an eye of the person. In this embodiment, assume that an upper-body image of the person is taken (A2). The image taken by the W camera 1 is stored in a frame memory B.

Subsequently, an eye search area determination program stored in the program memory 10 is activated so that the CPU 7 determines an eye search area (A3).

Figure 4:
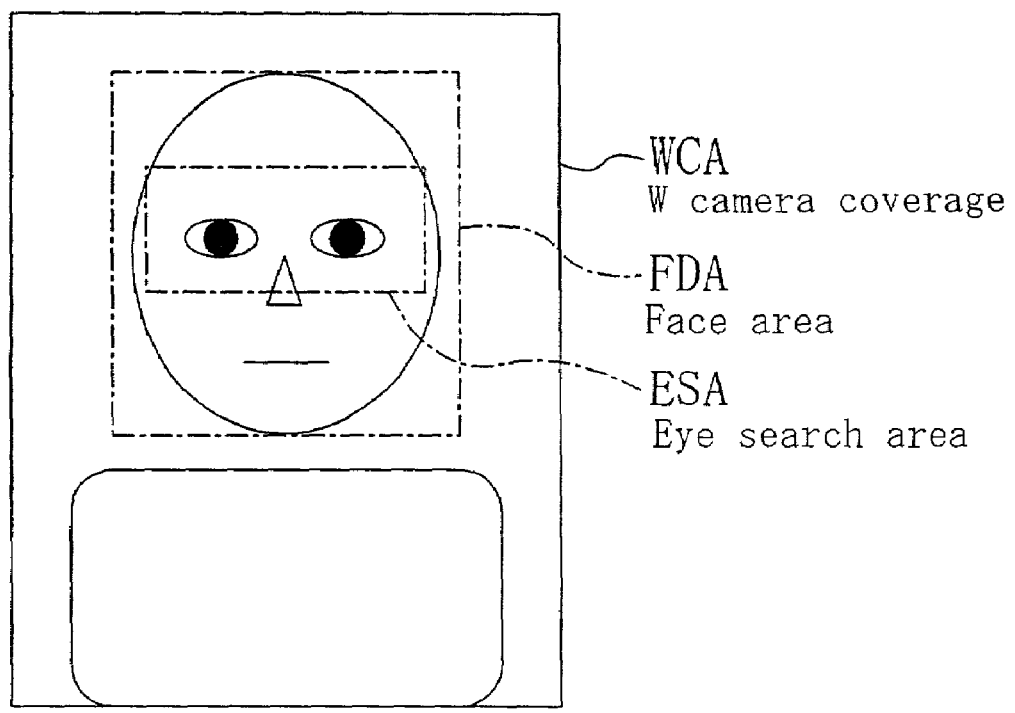
FIG. 4 is a view showing the relationship between a shot image, a face area, and an eye search area.

More specifically, as shown in FIG. 4, a human face area FDA is extracted from the upper-body image WCA taken by the W camera 1. Any technique may be adopted for this extraction as long as the face area FDA can be extracted stably. For example, the face area FDA is extracted by matching of the upper-body image with previously-prepared face templates. Such face templates can be prepared by normalizing a number of human faces taken under near infrared light by size and then averaging them, for example. A plurality of face templates having different sizes are preferably prepared. After the extraction of the face area FDA, a predetermined range of the face area FDA is specified as the eye search area ESA.

An eye position detection program stored in the program memory 10 is then activated for detection of the position of an eye from the eye search area ESA (A4). Details of this eye position detection, which is the feature of this embodiment, will be described later. In this embodiment, the positions of both eyes are detected from the image taken by the W camera 1, and the distance sensor 5 detects the distances from the eyes, so that the three-dimensional positions of the eyes are determined and sent to the N camera illuminator/N camera control section 11.

The N camera illuminator/N camera control section 11 controls pan and tilt of the N camera illuminator 4 and pan, tilt, and zoom of the N camera 3, with respect to the position of one of the two eyes previously determined to be used for iris recognition, to take a zoom-in eye image (A5). The eye image taken by the N camera 3 is sent to an iris recognition section 12, which verifies the iris of the received eye image against previously registered iris data (A6). Once the person is authenticated by the iris recognition section 12, an unlocking section 13 electrically releases a door lock (A7).

Figure 5:
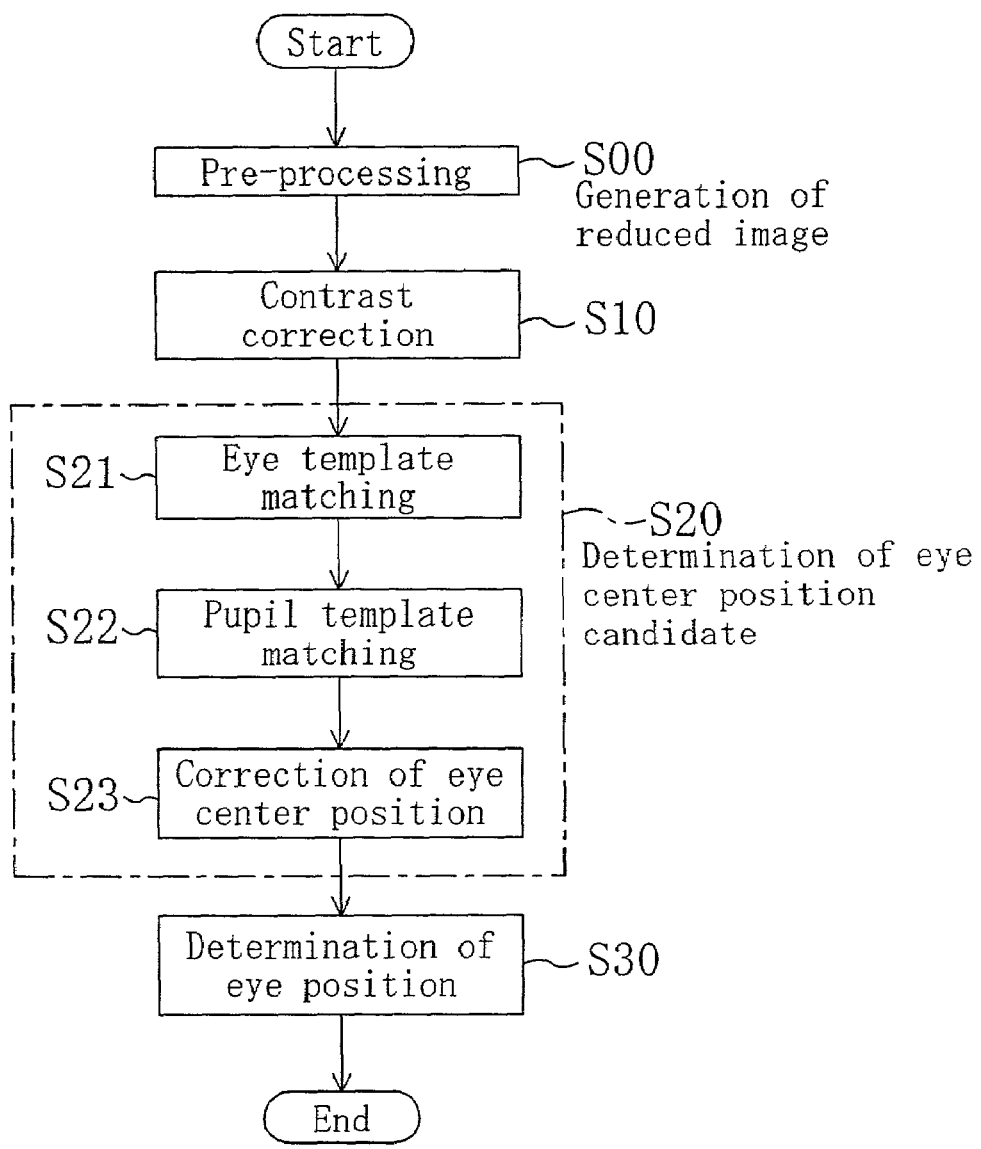
FIG. 5 is a flowchart of an outline of eye position detection of an embodiment of the present invention.
Figure 6:
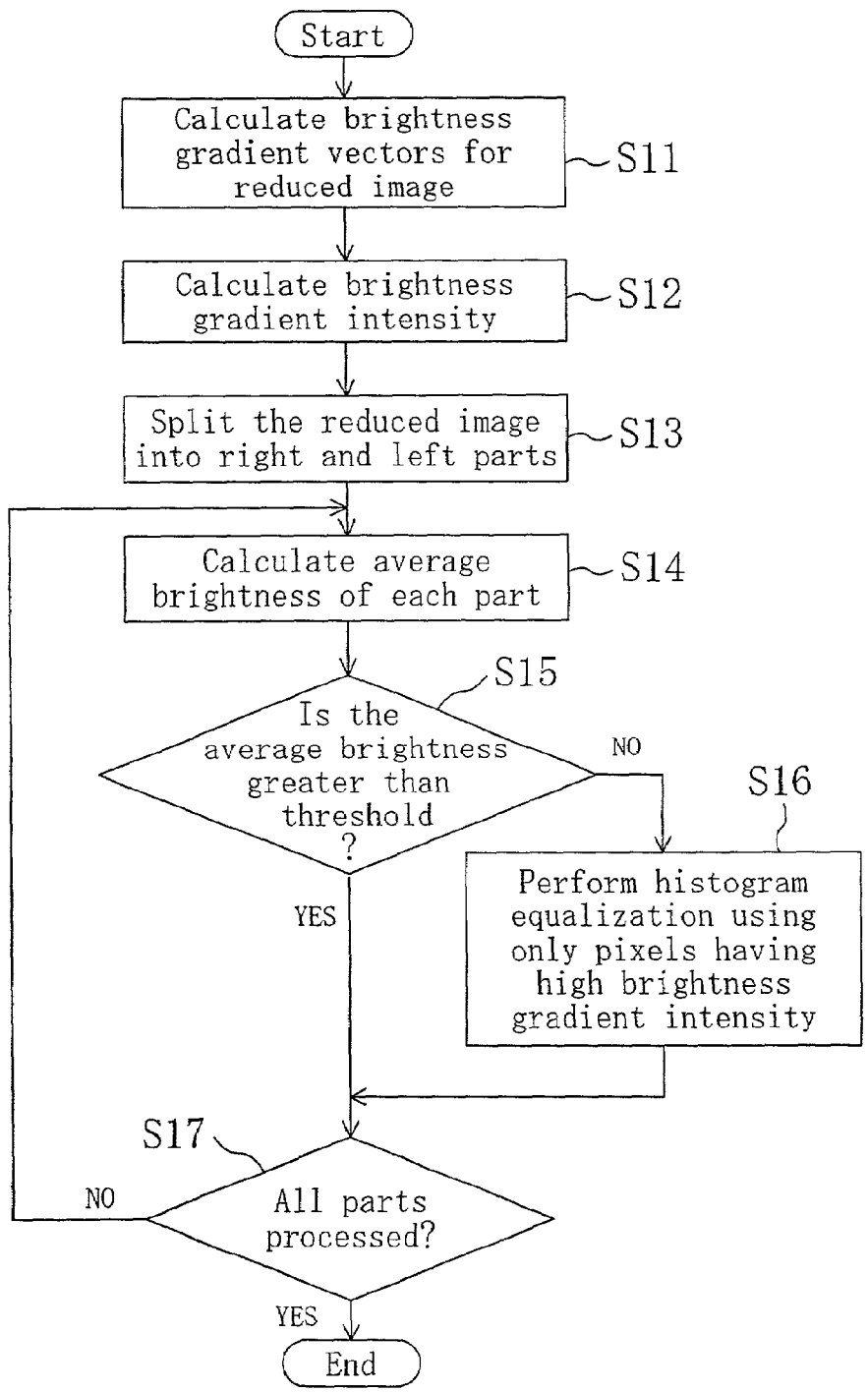
FIG. 6 is a flowchart of details of contrast correction shown in FIG. 5.
Figure 7:
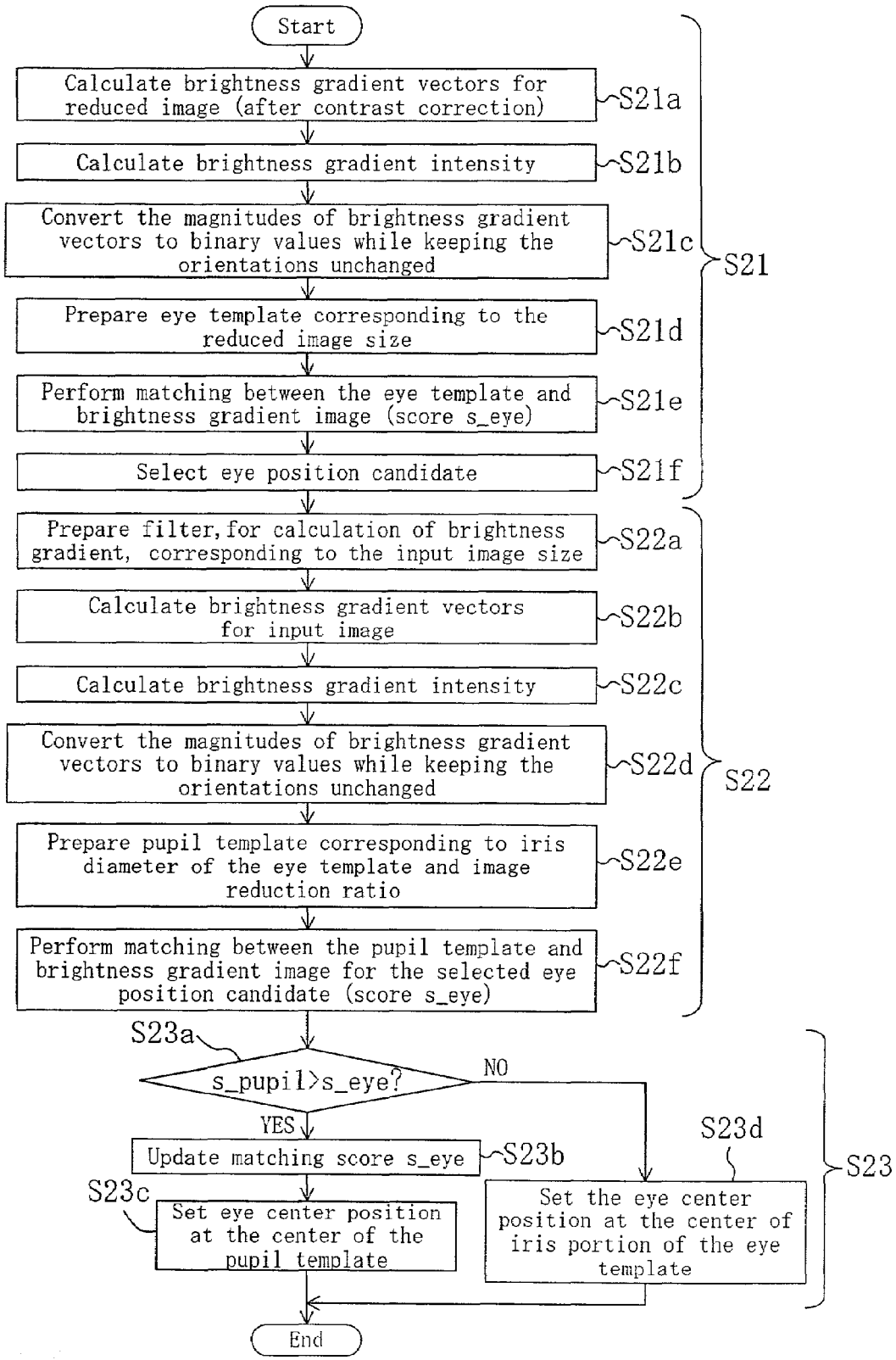
FIG. 7 is a flowchart of details of determination of eye position candidate shown in FIG. 5.
Figure 8:
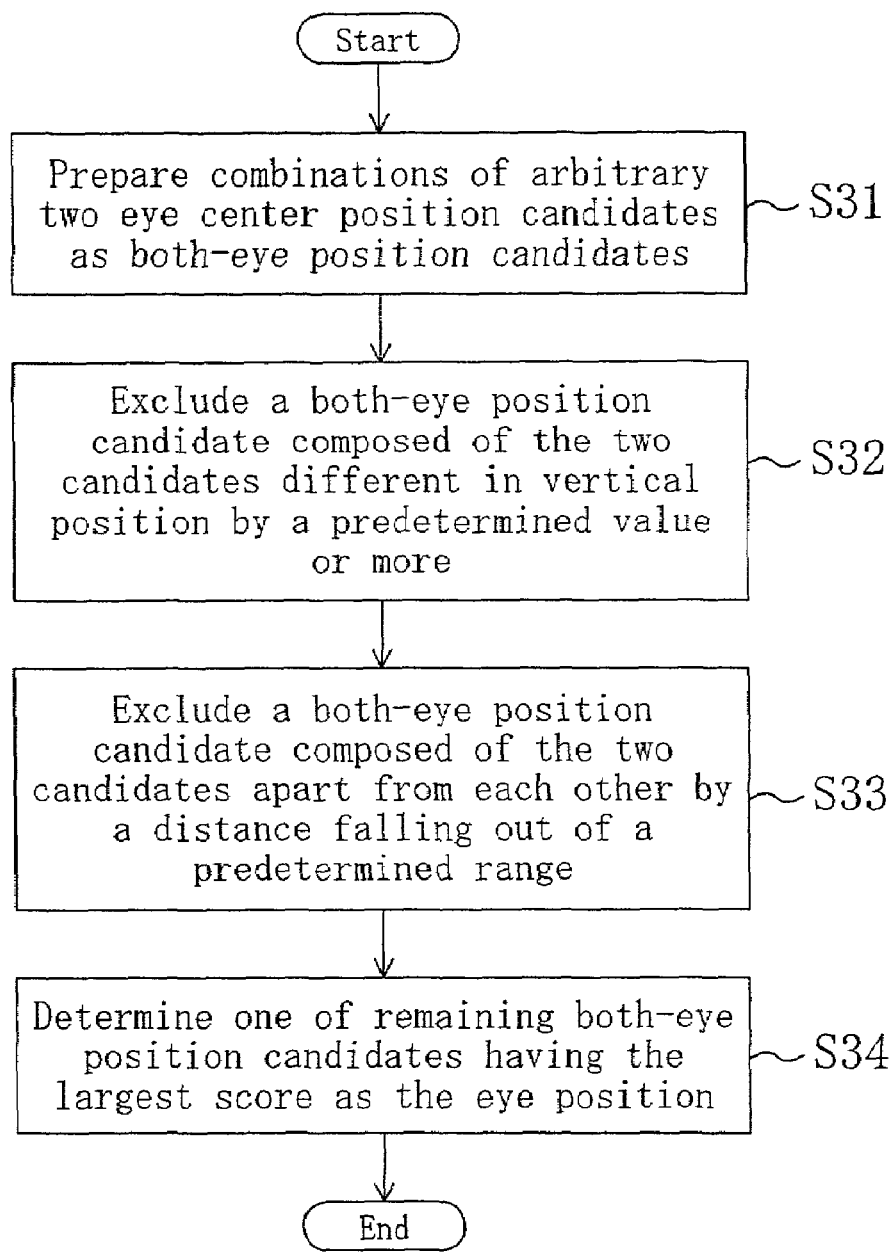
FIG. 8 is a flowchart of details of determination of eye position shown in FIG. 5.

Hereinafter, the eye position detection A4 in this embodiment will be described in detail. FIG. 5 is a flowchart of an outline of the eye position detection, and FIGS. 6 to 8 are flowcharts of details of process steps shown in FIG. 5.

<Pre-Processing S00>

In pre-processing S00, the size of an image of the eye search area ESA as a face image is reduced so as to fit a filter having a predetermined size, based on a correlation between the image size and the filter size previously determined so that the edges of the iris portion against the sclera portion are intensified.

Assume that the image of the eye search area ESA has a size of M in width and N in height and that a 3×3 Sobel filter as shown in FIG. 10 is used for brightness gradient calculation (edge extraction). Also assume that the ratio of the image size to the filter size that can increase the eye edge intensity is R. First, a width w of an image fitting the 3×3 Sobel filter, W=R×3, is calculated. The size of the original image of the eye search area ESA is then reduced to 1/n (n is a natural number) so that the width of the reduced image is closest to the calculated image width W. If the calculated image width W is greater than the width M of the original image, the original image is used as it is, not being enlarged.

Herein, for reducing the amount of calculation required, the image reduction to 1/n is performed in a mosaic manner. That is, the average value of n×n pixels of the original image is determined as the value of a pixel of the reduced image. Other techniques may be used. For example, image reduction may be performed by filtering using a low-pass filter such as a Gaussian filter and then sampling.

<Contrast Correction S10>

The reduced image of the eye search area is then subjected to brightness correction to increase the contrast between the sclera portion and iris portion of the eye.

FIGS. 9A and 9B diagrammatically illustrate examples of an image of an eye taken under visible light (9A) and under near infrared light (9B). As shown in FIG. 9A, for the Mongoloid races, when an image of an eye is taken under visible light, both the iris and pupil of the eye appear dark, exhibiting high contrast between the iris portion and the sclera portion. On the contrary, when an image of an eye is taken under near infrared light, the brightness is gradually higher as the position shifts in the order of the pupil, the iris, and the sclera, failing to exhibit contrast between the iris portion and the sclera portion as high as that under visible light. Substantially the same tendency is observed when the iris has another color such as blue, brown, green, or gray.

As described above, when taken under near infrared light, the image is low in the contrast between the sclera portion and the iris portion (iris and pupil). For this reason, in this embodiment, the contrast correction is performed to enhance the intensity of a brightness gradient corresponding to an edge of the iris periphery used for matching with templates. In this embodiment, the contrast correction is performed so that the intensity of the brightness gradient corresponding to each of edges of the eye (upper eyelid and iris periphery) is enhanced.

In this embodiment, histogram equalization is adopted for the contrast correction. The "histogram equalization" as used herein refers to the processing in which, when the intensity values of pixels concentrate in a specific range, the contrast is increased for this range, while it is reduced for a range with a low incidence (for details, see "Image analysis handbook", University of Tokyo Press, p. 480).

Hereinafter, the contrast correction S10 will be described in detail along with the flowchart of FIG. 6.

First, brightness gradient vectors are calculated for the reduced image generated in the pre-processing S00 (S11). In this embodiment, brightness gradient vectors Dsx(i,j) and Dsy(i,j) in the x and y directions are calculated using two 3×3 Sobel filters as shown in FIG. 10. The square root of the sum of squares of the brightness gradient vectors Dsx(i,j) and Dsy(i,j) is then calculated according to the expression below, to obtain a brightness gradient intensity V(i,j) and thus generate a brightness gradient image (S12).

$$V(i,j)=sqrt(Dsx(i,j)^2+Dsy(i,j)^2)$$

Thereafter, the reduced image is split into two right and left parts (S13), and the following process steps (S14 to S17) are performed for each of the right and left parts.

First, the average brightness of each part is calculated (S14), and compared with a predetermined threshold (S15). If the average brightness is greater than the threshold, no contrast correction is performed. If the average brightness is equal to or less than the threshold, the histogram equalization is performed for only pixels of the reduced image corresponding to the portion of the brightness gradient image having a high brightness gradient intensity (S16). Herein, the pixels having a brightness gradient intensity falling within A % of top intensity values is regarded as a portion having a high brightness gradient intensity. Note that although the expression for conversion of the pixel value for the histogram equalization is calculated using only pixels having a brightness gradient intensity falling within A % of top values, conversion of the pixel value is performed for all pixels.

Figure 11A:
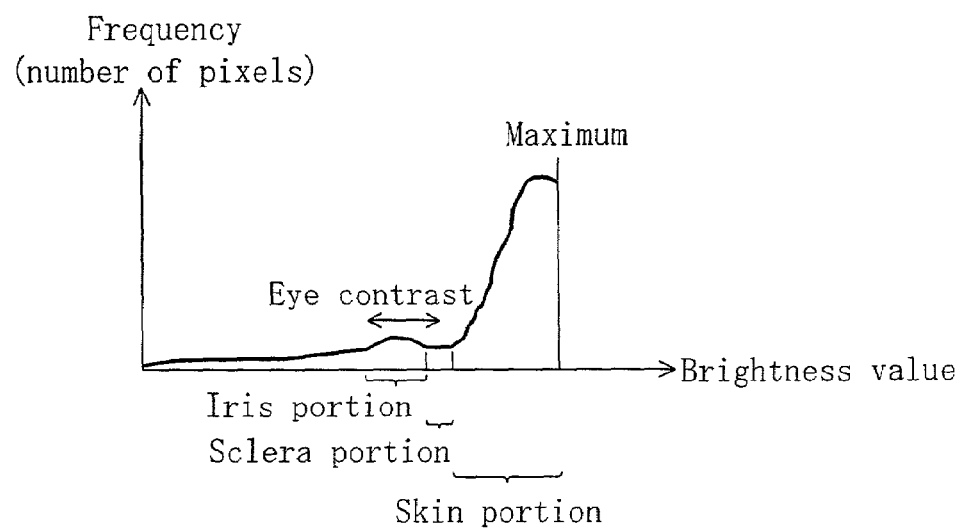
FIGS. 11A and 11B are views showing the relationship between the brightness of respective portions and the effect of the contrast correction.

The reason why no contrast correction is performed when the average brightness of the part is greater than the threshold is as follows. The average brightness of the part will be greater than the threshold when the brightness value is nearly saturated as shown in FIG. 11A, in which most of the skin portion and the sclera portion are whitened. The brightness value becomes nearly saturated presumably partly because the illumination is too bright and the aperture of the camera lens is too large. An image of which the brightness value is nearly saturated is high in the contrast between the iris portion and the sclera portion, compared with the normal case. Therefore, in such a case, no contrast correction is required.

Figure 11B:
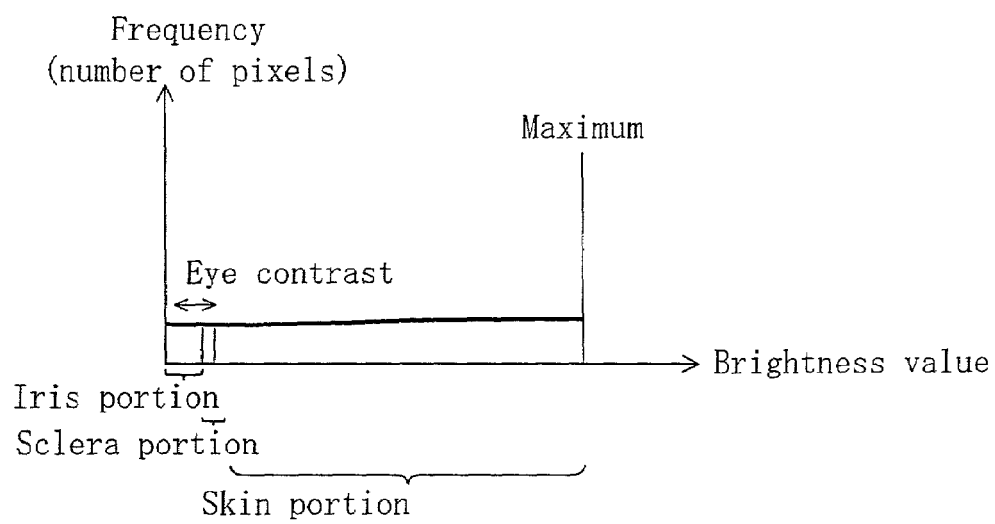

On the contrary, if the contrast correction is performed for the case as shown in FIG. 11A, a portion including many pixels having a high brightness value is subjected to the contrast correction. As a result, as shown in FIG. 11B, while the contrast is further enhanced in the high-brightness portion such as the skin, it is contrarily reduced in the portion near the eye composed of darker pixels. This phenomenon may occur even when only pixels in the portion having a high brightness gradient intensity are used for the contrast correction. Therefore, it is rather desirable not to perform the contrast correction.

The histogram equalization is performed using only pixels corresponding to the portion having a high brightness gradient intensity as described above. This means that the pixels used for the histogram equalization include a large number of pixels having a brightness value corresponding to an edge portion of the eye. As a result, the contrast at the edge portion of the eye can be efficiently improved. Note that, in place of using pixels having a brightness gradient intensity falling within A % of top values, a portion of pixels of which the brightness gradient intensity is equal to or higher than a threshold may be regarded as a portion having a high brightness gradient intensity.

The reason why the reduced image is split into two right and left parts is as follows. In the iris recognition system of FIG. 1, the W camera illuminator 2 is placed on a side of the W camera 1. Therefore, when a person stands near the W camera 1, the person will be illuminated with light from a side direction. With this illumination, the lightness is different between the right and left halves of the face, and therefore the brightness of the resultant image tends to be uneven. As a result, the histogram equalization over the entire image fails to provide a sufficient effect. By splitting the image into a plurality of parts and performing the histogram equalization separately for the respective parts, it is possible to perform the contrast correction appropriate for the brightness of each part.

The reduced image may be split into two equal right and left parts. Alternatively, by detecting the nose by image recognition, the image may be split into right and left parts with respect to the position of the nose. In this embodiment, the image is split into right and left parts. Naturally, however, if the illuminator is placed above the camera and for this reason the brightness tends to be uneven between the upper and lower parts of the resultant image, the image may be split into upper and lower parts.

In the iris recognition system of FIG. 1, illuminator disposition will be described as a supplement.

In the case that the angle formed by the optical axes of the illuminator and the camera is small, when an image of an eyeglass wearer is taken, reflection from the eyeglasses will overlap the irises of the eyes with high possibility. If this occurs, not only the eye position detection but also the iris recognition itself become difficult. To overcome this problem, in the system of FIG. 1, the illuminator is placed apart from the camera in the lateral direction, to thereby secure the angle formed by the optical axes of the illuminator and the camera to some extent.

Figure 12:
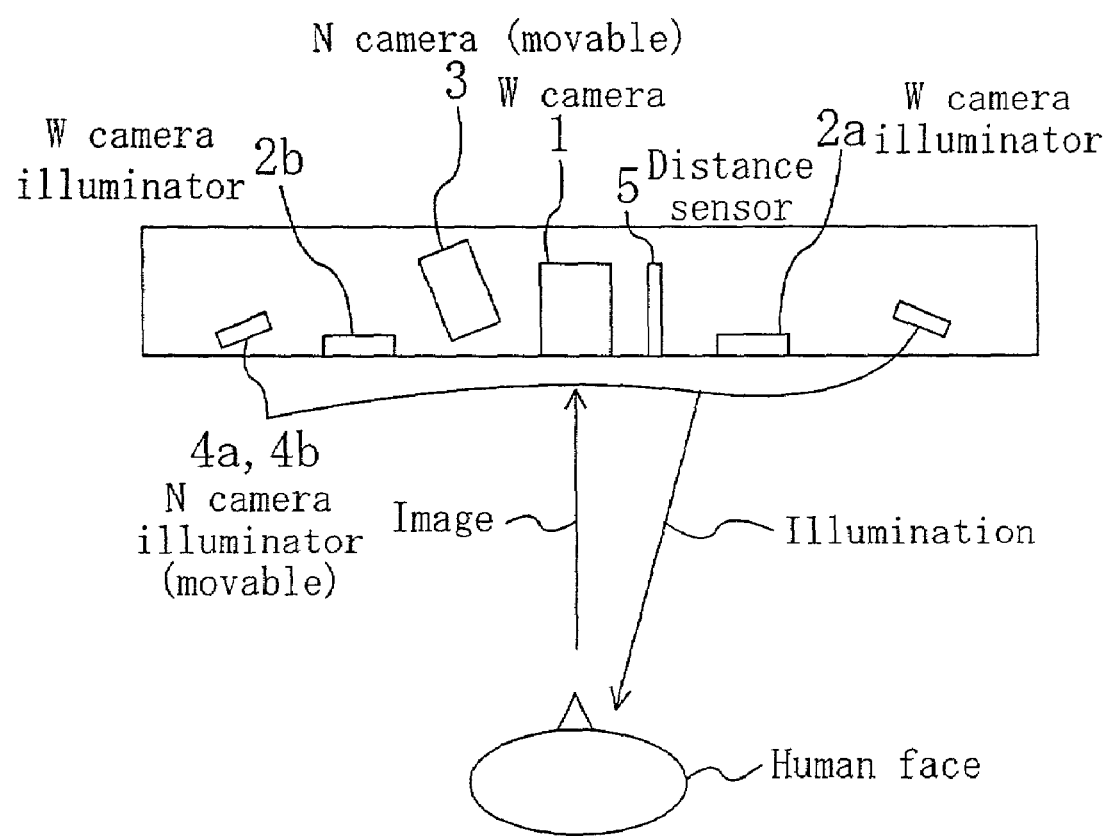
FIG. 12 is a view of a schematic configuration of another iris recognition system using the eye position detection according to the present invention.

A system configuration as shown in FIG. 12 is also effective, in which illuminators 2a and 2b and illuminators 4a and 4b are placed on both sides of the cameras 1 and 3, respectively. In this system, for example, only one illuminator for each camera may be activated first to take an image, and if eye position detection fails, the other illuminator may be activated for second image taking.

<Determination of Eye Center Position Candidate S20>

Upon termination of the contrast correction, some eye position candidates are determined from the resultant image. This process step S20 is divided into three steps of eye template matching S21, pupil template matching S22, and correction of eye center position S23. This process step will be described in detail along with the flowchart of FIG. 7.

(Eye Template Matching S21)

First, brightness gradient vectors are calculated for the contrast-corrected reduced image (S21a). Herein, as in the contrast correction, two 3×3 Sobel filters as shown in FIG. 10 are used to calculate brightness gradient vectors Dsx2(i,j) and Dsy2(i,j) in the x and y directions. The square root of the sum of squares of the brightness gradient vectors Dsx2(i,j) and Dsy2(i,j) are calculated according to the following expression, to obtain a brightness gradient intensity V2(i,j) (S21b).

$$V2(i,j)=sqrt(Dsx2(i,j)^2+Dsy2(i,j)^2)$$

In addition, the magnitudes of the brightness gradient vectors Dsx2(i,j) and Dsy2(i,j) are converted to binary values while the orientations thereof are kept unchanged (S21c). For example, the magnitude is set at "1" for brightness gradient vectors having a brightness gradient intensity V2(i,j) falling within B % of top values, and it is set at "0" for the other brightness gradient vectors.

Thereafter, an eye template for matching is generated (S21d). Herein, the size of the eye template is determined depending on the size of the contrast-corrected reduced image. For example, the correlation between the image size and the diameter of the iris is previously determined from a collection of images of the eye search area taken previously. Based on this correlation, the diameter D of the iris corresponding to the size of the reduced image is determined, and an eye template having a size corresponding to the diameter D is generated.

Figure 13A:
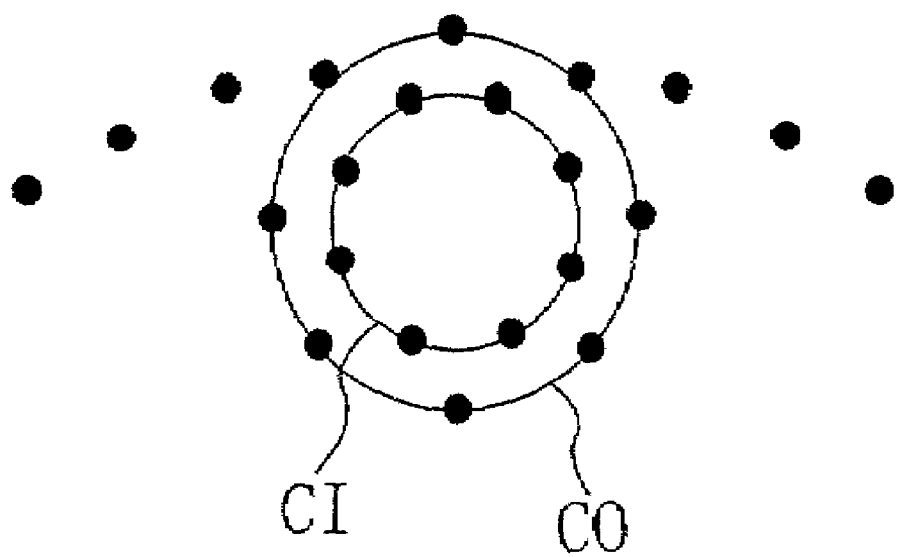
FIGS. 13A and 13B are views of an example of an eye template in this embodiment.
Figure 13B:
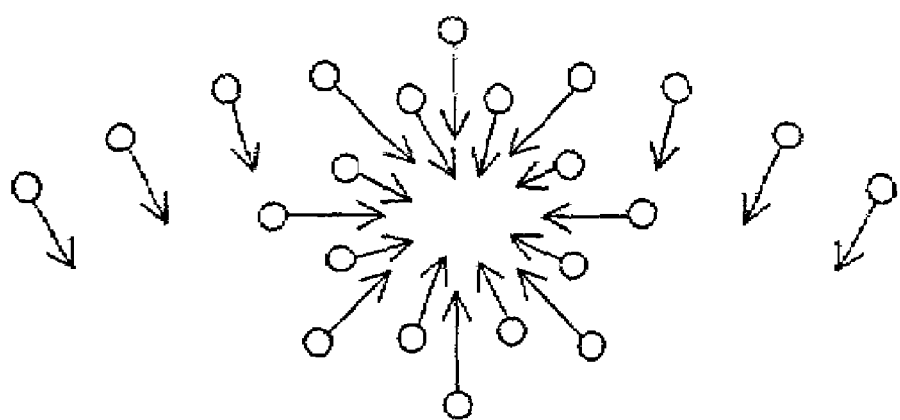

FIGS. 13A and 13B illustrate an example of an eye template used in this embodiment. Referring to FIG. 13A, the eye template in this embodiment includes a plurality of points, which include upper-eyelid contour points, that is, points placed along a curve defining the boundary between the upper eyelid and the eyeball, and iris contour points, that is, points placed along the periphery of the iris. The iris contour points are placed so that they form n circles having different radii (n is an integer equal to or more than 2). In this embodiment, it is determined that n=2, the diameter of the outer circle CO is 1.1×D, and the diameter of the inner circle CI is 0.9×D.

In the example shown in FIG. 13A, the number of upper-eyelid contour points is six in total, each three on the right and left sides. The number of iris contour points is 16 in total, each eight on the outer and inner circles. The points on the outer circle CO are placed at a displaced phase from those on the inner circle CI. Specifically, in FIG. 13A, the points on the outer circle CO are placed every 45 degrees from the position of 12 o'clock, while the points on the inner circle CI are placed every 45 degrees from the position shifted by 22.5 degrees from the position of 12 o'clock.

As shown in FIG. 13B, each point of the eye template is composed of a two-dimensional vector having an orientation. The magnitude of each vector is 1. The orientation of the vector is toward the center of the circle for the iris contour points, and it is orthogonal to the line connecting the upper-eyelid contour points and downward for the upper-eyelid contour points. During matching to follow, a matching score representing the degree of matching between the two-dimensional vectors of the points and the brightness gradient vectors of the reduced image is calculated.

Matching between the eye template and the brightness gradient image is then performed (S21e), and some eye templates are selected in the descending order of the matching scores s_eye as eye position candidates (S21f).

The matching score s_eye is calculated according to the following expression.

$$s\_eye = \frac{1}{N}\sum_{i=1}^{N}(Ix \cdot Tx + Iy \cdot Ty)$$

In this expression, calculated is the average of the inner products of the gradient vectors (Ix,Iy) (Ix=Dsx2(i,j), Iy=Dsy2(i,j)) of the brightness gradient image and the vectors (Tx,Ty) of the respective points of the eye template. Herein, the inner product is calculated only when the brightness value of a point on the image corresponding to each point of the eye template is equal to or less than a predetermined threshold. In other words, any point of which the brightness value is greater than the threshold is not counted in the matching score calculation. In the expression, N denotes the effective number of points of the eye template counted in the matching score calculation.

Any point of which the brightness value is greater than the threshold is considered a portion in which the brightness value is saturated due to reflection of an eyeglass or the like. Such a portion has no or an extremely small brightness gradient. Therefore, if this point is counted in the matching score calculation, the matching score will decrease when reflection from an eyeglass overlaps the edge portion of the eye. This results in failure of good detection of the eye position. To overcome this problem, in this embodiment, a point of which the brightness value is greater than a predetermined threshold is excluded from the matching score calculation. In this way, the eye position can be detected stably even when reflection from an eyeglass overlaps the eye to some extent.

The use of the eye template having the n-circle structure as shown in FIGS. 13A and 13B for matching provides the following effect. In the estimation of the diameter of the iris from the image size, the estimated iris diameter may differ from the actual iris diameter due to an error in the estimation of the face area, a difference in iris size among individuals, and the like. In such a case, if a single-circle template is used, the eye position may fail to be successfully located in the matching between an image and this eye template. Conventionally, to overcome this problem, a plurality of single-circle templates having different sizes are used to absorb any error in iris diameter. However, this conventional method increases the time required for the template matching. By using a template having the n-circle structure for the iris portion as in this embodiment, matching is successful using only one template even when the iris diameter estimated from the image has an error to some extent.

In an image taken under near infrared light, in which the brightness smoothly changes between the sclera portion and the iris portion, the brightness gradient is sustained over a predetermined range of the image. Therefore, in this case, the n-circle structure of the template less causes adverse effects compared with the case of taking an image under visible light.

Figure 14A:
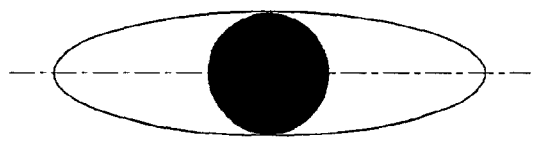
FIGS. 14A, 14B, and 14C are views illustrating the relationship between an eye image taken under visible light and the eye template in this embodiment.
Figure 14B:
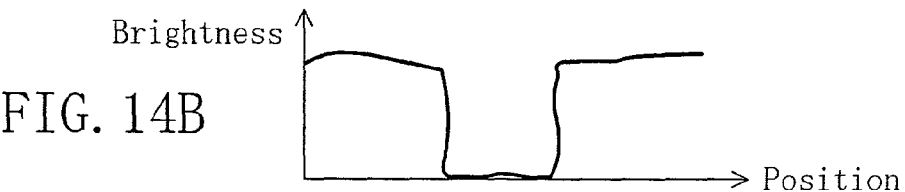
Figure 14C:
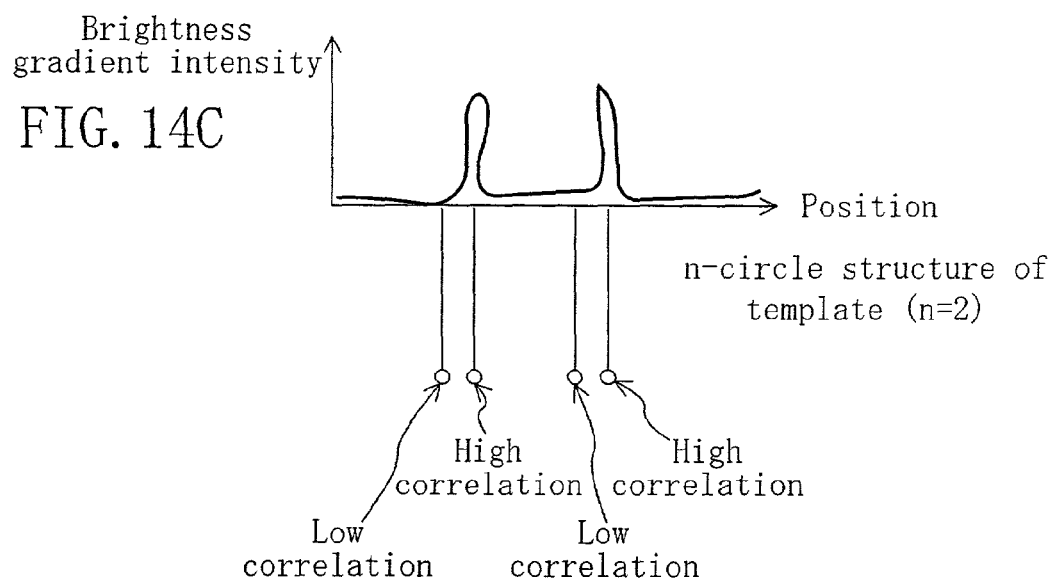
Figure 15A:
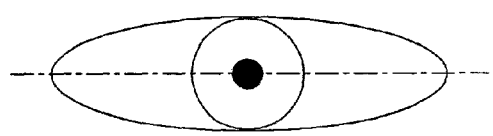
FIGS. 15A, 15B, and 15C are views illustrating the relationship between an eye image taken under near infrared light and the eye template in this embodiment.
Figure 15B:
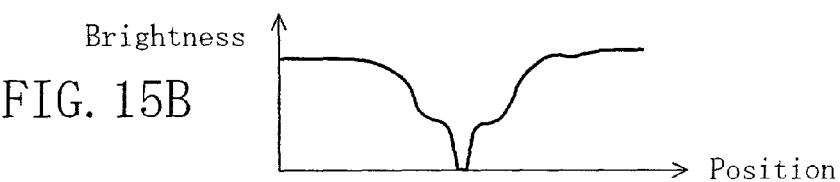
Figure 15C:
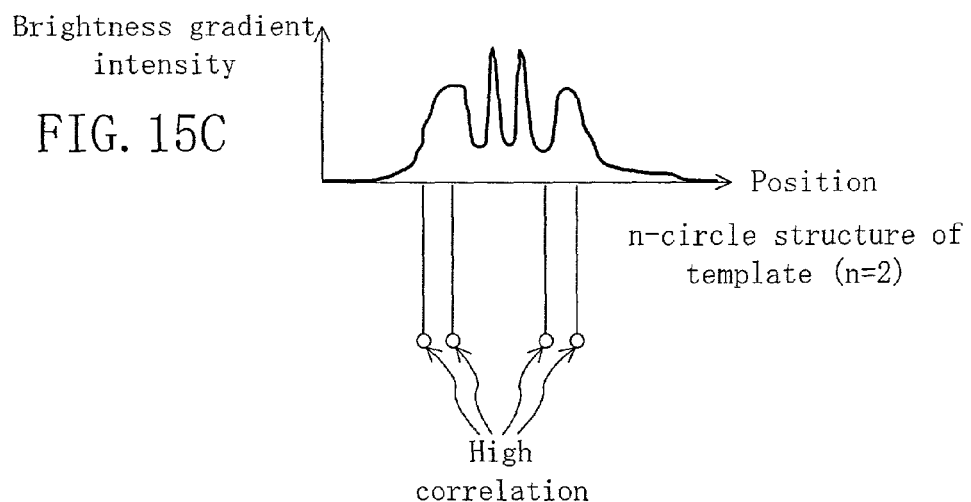

FIGS. 14A to 14C illustrate the relationship between an image taken under visible light and the eye template in this embodiment. FIGS. 15A to 15C illustrate the relationship between an image taken under near infrared light and the eye template in this embodiment. FIGS. 14A and 15A diagrammatically illustrate an eye image. FIGS. 14B and 15B are a lateral distribution of the brightness along the dashed line across the eye image of FIGS. 14A and 15A. FIGS. 14C and 15C are a distribution of the brightness gradient intensity obtained from the brightness distribution of FIGS. 14B and 15B.

As shown in FIGS. 14A to 14C, in the eye image taken under visible light, the difference in brightness is great between the iris and the sclera, causing sharp change of the brightness. Therefore, in the n-circle structure of the eye template used in this embodiment, some points exhibit high correlation while the others exhibit low correlation. In other words, by adopting the n-circle structure for the eye template, matching may rather fail to work well. On the contrary, as shown in FIGS. 15A to 15C, in the eye image taken under near infrared light, the difference in brightness is small between the iris and the sclera, causing smooth change of the brightness. This provides a portion having a high brightness gradient intensity over a certain range. Therefore, in the n-circle structure of the eye template used in this embodiment, all points exhibit high correlation. Thus, the eye position can be detected without fail even when the iris diameter estimated from the image has an error to some extent.

The eye template in this embodiment is also effective for an eye image taken under light other than near infrared light as long as the eye image has a smoothly changing brightness. For example, if an image is taken out of focus intentionally, the brightness of the image will change smoothly even when it is taken under visible light. In this case, therefore, the eye template in this embodiment is effective. The eye template in this embodiment is also considered effective in the case of taking an image of a person who has light-color irises and therefore has a small difference in brightness between the iris and the sclera.

In the example shown in FIGS. 13A and 13B, n=2 (double circle), the number of points in the upper eyelid portion is six, and the number of points in the iris portion is 16. Alternatively, other values may be set.

In this embodiment, only the iris contour points were arranged to form n circles (n=2). The upper-eyelid contour points may also be arranged to form m curves. The m curves may not necessarily run at a constant distance from each other. For example, the m curves may be farther from each other as they are nearer to the ends of the eye. By providing m curves at the boundary between the eyelid and the eyeball as described above, it is possible to meet a variation in eyelid shape with individuals, double eyelids, and the like.

The conversion of the magnitude of the brightness gradient vector to a binary value provides the following effects during the matching. The calculation time is shortened due to a reduced number of pixels to be matched. Also, the matching can be performed based on only the orientation of the brightness gradient irrespective of the magnitude of the brightness gradient. This prevents erroneous matching with a portion having a large brightness gradient.

When the magnitude of the brightness gradient is "0", the correlation of the matching is invariably 0. When it is "1", only the orientation of the brightness gradient contributes to the matching irrespective of the magnitude of the brightness gradient. Since the edge intensity of the eye has been increased by the contrast correction, it is ensured that the edge portions of the eye belong to the pixels contributing to the matching. In this way, reduction of the processing amount is attained without deteriorating the matching precision.

(Pupil Template Matching)

Next, the eye position candidates selected in the eye template matching S21 are subjected to matching with pupil templates.

First, a brightness gradient calculation filter corresponding to the image size of the original eye search area is generated (S22a). In the pre-processing S00, the previously-calculated correlation between the image size and the edge detection filter size that can intensely respond to the eye edge was used for generation of the reduced image from the input image. In this step, this correlation is used to determine the size of an optimal brightness gradient calculation filter. Assume that the size is an odd value equal to or more than 3. When the size is 3, the brightness gradient calculation filter is the normal Sobel filter. Once the size is determined, a filter having this size previously prepared is used as the brightness gradient calculation filter in this embodiment.

Thereafter, using the thus-generated brightness gradient calculation filter, brightness gradient vectors $Dx(m,n)$ and $Dy(m,n)$ are calculated for an input image $Io(m,n)$ in the eye search area (S22b). The square root of the sum of squares of the brightness gradient vectors $Dx(m,n)$ and $Dy(m,n)$ is then calculated according to the following expression, to obtain a brightness gradient intensity $V3(m,n)$.

$$V3(m,n)=sqrt(Dx(m,n)^2+Dy(m,n)^2)$$

In addition, the magnitudes of the brightness gradient vectors $Dx(m,n)$ and $Dy(m,n)$ are converted to binary values while the orientations thereof are kept unchanged (S22d). For example, the magnitude is set at "1" for brightness gradient vectors having a brightness gradient intensity $V3(m,n)$ falling within C % of top values, and it is set at "0" for the other brightness gradient vectors.

Thereafter, a pupil template used for matching is generated (S22e). Herein, the size of the pupil template is determined depending on the diameter of the iris portion of the eye template used for calculation of the eye position candidate in question and the reduction ratio of the image.

Figure 16A:
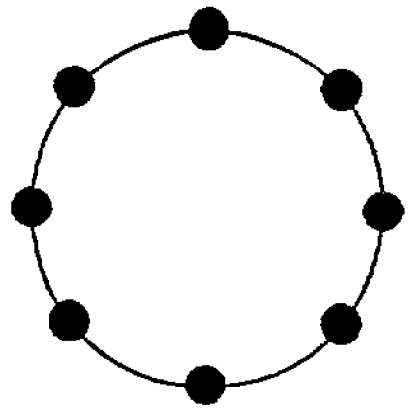
FIGS. 16A and 16B are views of a pupil template in this embodiment.
Figure 16B:
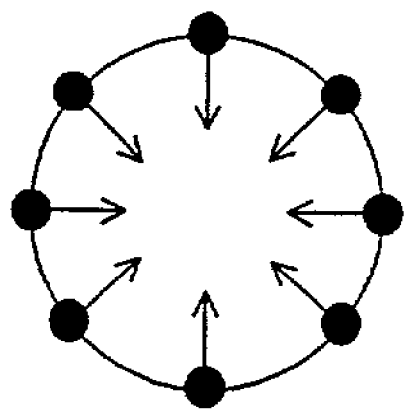

FIGS. 16A and 16B illustrate an example of the pupil template used in this embodiment. In this embodiment, several possible values of the pupil diameter are prepared depending on the diameter of the iris portion of the eye template used in the matching and the reduction ratio of the image during the matching using the eye template. The reason for preparing a plurality of templates having different pupil diameters is to meet not only a variation in pupil diameter with individuals but also changes in pupil diameter due to the ambient lightness. For each pupil diameter, a template as shown in FIG. 16A is prepared in which Tp points (Tp=8 in FIG. 16A) are arranged along a circle at an equal spacing between the adjacent points. As shown in FIG. 16B, each point of the pupil template is composed of a two-dimensional vector having an orientation. Each vector has a magnitude of 1 and is directed toward the center of the circle. During matching to follow, a matching score representing the degree of matching between the two-dimensional vectors of the points and the brightness gradient vectors of the input image is calculated.

Subsequently, matching between each pupil template and the brightness gradient image is performed for each of the selected eye position candidates (S22f). The matching is performed for a rectangular region circumscribing the portion corresponding to the iris portion of the eye position candidate. A matching score s_pupil is then calculated according to the following expression. Note that although pupil templates having a plurality of sizes are used, the score s_pupil obtained using the size and position of a pupil template providing the greatest score s_pupil is selected as the final score.

$$s\_pupil = \frac{1}{M}\sum_{i=1}^{M}(Ix \cdot Tx + Iy \cdot Ty)$$

In this expression, calculated as the matching score s_pupil is the average of the inner products of the gradient vectors $(Ix,Iy)$ $(Ix=Dx(m,n), Iy=Dy(m,n))$ of the brightness gradient image and the vectors $(Tx,Ty)$ of the respective points of the pupil template. Herein, the inner product is calculated only when the brightness value of a point on the image corresponding to a point of the pupil template is equal to or less than a predetermined threshold. In other words, a point of which the brightness value is greater than the threshold is not counted in the matching score calculation. In the expression, M denotes the effective number of points of the pupil template counted in the matching score calculation.

(Correction of Eye Center Position)

Next, the matching score s_pupil obtained using the pupil template is compared with the matching score s_eye obtained using the eye template (S23a). If the matching score s_pupil obtained using the pupil template is greater than the matching score s_eye obtained using the eye template, the matching score s_eye is updated according to the following expression (S23b), and sets the center position of the eye at the center of the portion matching with the pupil template (S23c).

$$s\_eye = \frac{1}{N+M}(N \cdot s\_eye + M \cdot s\_pupil)$$

wherein N denotes the effective number of points of the eye template, and M denotes the effective number of points of the pupil template. On the contrary, if the matching score s_pupil obtained using the pupil template is equal to or smaller than the matching score s_eye obtained using the eye template, the center position of the eye is set at the center of the iris of the portion matching with the eye template (S23d).

Alternatively, in step S23a, whether or not the matching score should be updated may be determined depending on whether or not the matching score s_pupil obtained using the pupil template is greater than a predetermined threshold.

The following effect is attained by adopting the eye position detection in this embodiment described above in which the eye position is first searched for by the matching using the eye template and then re-searched for by the matching-using the pupil template.

In the eye image taken under near infrared light, the brightness is different, not only between the iris portion and the sclera portion, but also between the iris portion and the pupil portion, as shown in FIG. 9B. In particular, when the eye image is taken with high resolution, a clear edge is exhibited between the iris portion and the pupil portion by calculating the brightness gradient. This embodiment utilizes this edge of the pupil portion.

The diameter of the pupil varies with the ambient lightness. In addition, in an image taken with low resolution, the iris is darker in the center and becomes lighter toward the periphery thereof. It is therefore difficult to locate the eye using only the edge of the pupil. Moreover, since the edge of the pupil is circular and dark in the center, the brightness gradient is inward from the outer surroundings. Therefore, if the pupil template is used for the search from the beginning, a nostril, a spot, and the like may be mistakenly detected.

In this embodiment, therefore, eye position candidates are first determined using the eye templates, and then the pupil is searched for from the iris portion of each eye position candidate using the pupil template, to determine an eye center position candidate. This method is very effective in the aspect of the precision of detection of the eye center position. For example, when the 2-camera structure is adopted as in the system of this embodiment, it is desirable to calculate the eye center position as precisely as possible in consideration of influence of an error in the mechanical scanning of the N camera. Thus, by updating the eye center position using the pupil template, it is possible to reduce the possibility that an image of the iris may fail to be taken when the eye is zoomed.

In addition, by updating the matching score obtained using the eye template by use of the matching score obtained using the pupil template, it is possible to prevent the position of an object other than the eye from being detected as the eye position. For example, suppose the actual eye position and a position of an object other than the eye have matching scores similar to each other. In this case, if the image of the pupil of the eye is clear by being taken with high resolution, the matching score obtained using the pupil template should be high at the position of the actual eye. In view of this, by incorporating the matching score obtained using the pupil template into the original matching score obtained using the eye template, the actual eye can be distinguished from an object other than the eye.

<Determination of Eye Position S30>

By the process steps performed so far, the eye center position candidates were determined. In this process step, the eye position is finally determined from the eye center position candidates. This process step will be described in detail along with the flowchart of FIG. 8.

First, combinations of each two candidates chosen arbitrarily among the determined eye center position candidates are prepared as both-eye position candidates (S31). As the score of each both-eye position candidate, the average of the scores s_eye of the two eye center position candidates constituting the both-eye position candidate is used.

Any of the both-eye position candidates of which the two eye center position candidates are different in vertical position by an amount equal to or greater than a predetermined value is excluded (S32). This predetermined value is calculated based on the size of the eye search area. Further, any of the remaining both-eye position candidates of which the two eye center position candidates are apart from each other by a distance failing to fall within a predetermined range is excluded (S33). This predetermine range is determined from the minimum and maximum distances calculated based on the size of the eye search area. Steps S32 and S33 represent the processing of excluding any of the both-eye position candidates considered inappropriate in view of the positional relationship between the two eyes.

The one among the remaining both-eye position candidates having the largest score is finally determined as the positions of the two eyes (S34)

<Correlation Between Image Size and Filter Size>

As described earlier, this embodiment utilizes the previously-calculated correlation between the image size and the filter size that can intensely respond to the eye edge. The input image is reduced to conform to the size of the previously-prepared filter. By filtering the reduced image using this filter, it is possible to generate a brightness gradient image with the eye edge intensity comparatively enhanced.

In the image taken under near infrared light, the brightness of the iris portion is high, and therefore is not so different from the brightness of the sclera portion. Therefore, the change in brightness from the iris portion toward the sclera portion is smooth. In view of this, it is presumed that in extraction of the iris/sclera edge, there must be a size of the edge detection filter appropriate for a given image size.

The correlation between the image size and the filter size is calculated in the following manner.

Figure 17:
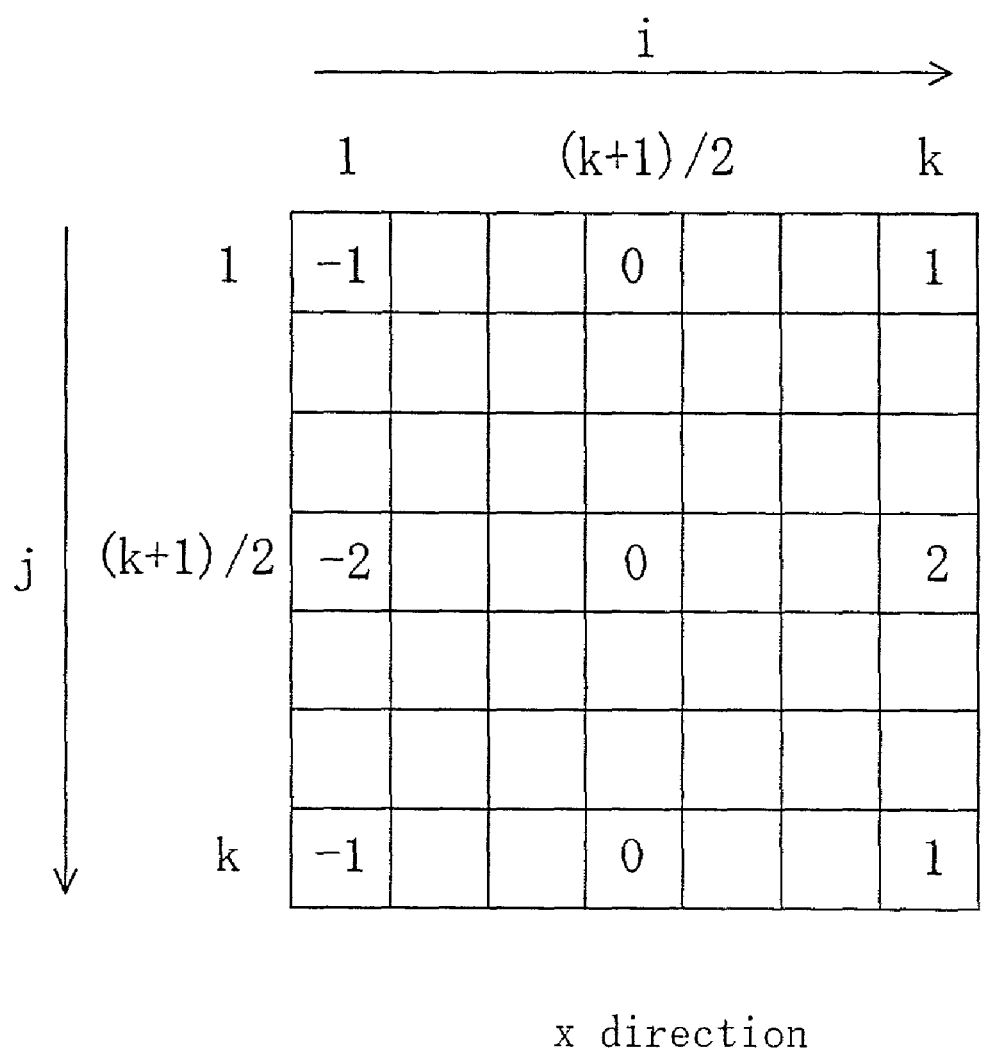
FIG. 17 is a view showing a k×k brightness gradient calculation filter.

First, prepared are brightness gradient calculation filters as shown in FIG. 17 having various sizes k×k (k is an odd number) larger than the size 3×3. These filters can be prepared by smoothly interpolating values between the coefficient values in the Sobel filter shown in FIG. 10. Coefficient values to be interpolated may be calculated as follows.

For a filter for detecting an edge in the x direction, prepared are a two-dimensional Gaussian function $f1(i,j)$ in which a point $(i,j)=(1,(k+1)/2)$ is the center and the value is halved from the peak at a position apart from the center by a distance $(k-1)/2$ (wherein $f1(1,(k+1)/2)=-2$, $f1(1,1)=f(1,k)=-1$), and a two-dimensional Gaussian function $f2(i,j)$ in which a point $(i,j)=(k,(k+1)/2)$ is the center and the value is halved from the peak at a position apart from the center by a distance $(k-1)/2$ (wherein $f2(k,(k+1)/2)=2$, $f2(k,1)=f(k,k)=1$).

Each coefficient g(i,j) is obtained by calculation according to the following expression.

$$g(i, j) = \begin{cases} f1(i, j) & \cdots \quad (i = 1) \\ f1(i, j) + f2(i, j) & \cdots \quad (i \neq 1, k) \\ f2(i, j) & \cdots \quad (i = k) \end{cases}$$

FIG. 18 shows 5×5 filter coefficients obtained in the manner described above.

Figure 19A:
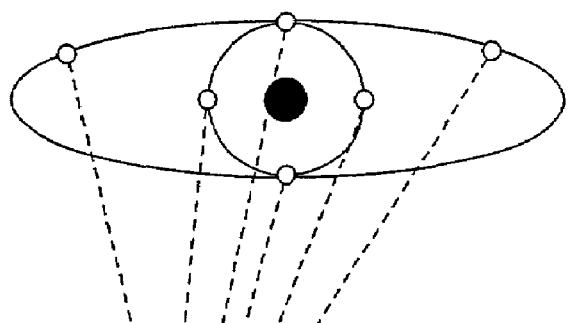
FIG. 19A is an illustration of edge intensity measuring points put on an image.

On the other hand, eye images having various sizes taken under near infrared light are collected. Edge intensity measuring points as shown in FIG. 19A are then set on each of the collected eye images manually, and the edge intensity (sum of squares of the brightness gradients in the x and y directions) when filtered is obtained. Specifically, measured at each measuring point of each of the collected eye images are a change in edge intensity observed when the filter size is changed while the image size is kept unchanged and a change in edge intensity observed when the scale of the image is changed while the filter size is kept at 3×3.

Figure 19B:
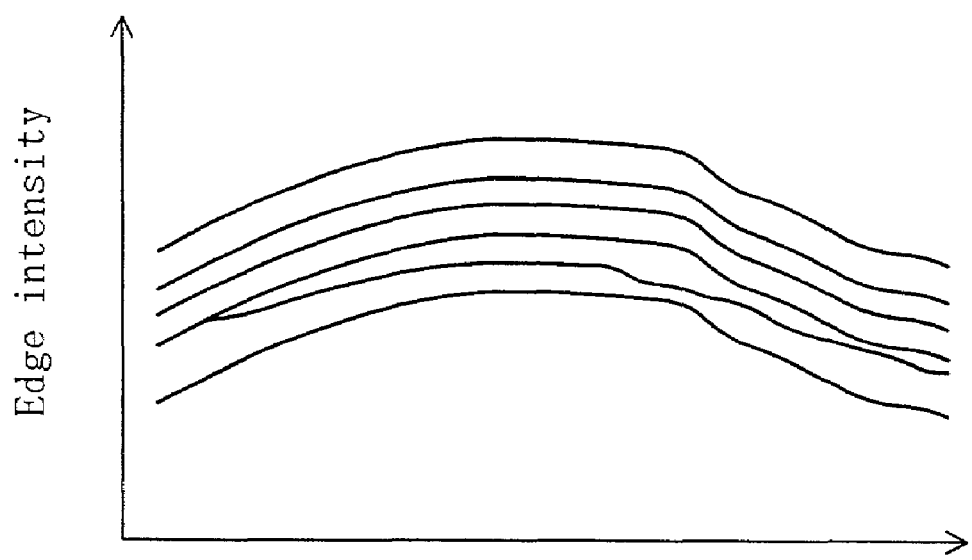
FIG. 19B is a graph showing the relationship between the ratio of image size to filter size and the edge intensity.

FIG. 19B is a graph showing the measured change in edge intensity. Under the condition that the camera always has proper focus, the edge intensity is high when the ratio of the image size to the filter size is a predetermined value as shown in FIG. 19B, irrespective of the difference among individuals, the positions of the measuring points on the periphery of the iris, and whether or not the filter size is changed or the image is reduced. This has been confirmed by experiments performed by the present inventors. In view of this, in this embodiment, the ratio of the image size to the filter size that can increase the edge intensity is previously stored and used for the brightness gradient calculation.

(Modifications)

In this embodiment, the size of the input image was reduced to conform to the filter size based on the previously-calculated correlation between the image size and the filter size in the contrast correction and the matching using the eye template. Alternatively, the filter size may be changed (enlarged) without changing the image size.

When the image size is reduced, the precision of the eye position detection more or less decreases, but the processing speed is high. On the contrary, when the filter size is enlarged, a large filter is used for a large face image, which increases the calculation time but prevents the precision from deteriorating.

In this embodiment, the matching using the eye template is performed for a reduced image, to roughly select eye position candidates. Thereafter, the matching using the pupil template is performed for the original image, to calculate the eye center. The matching using the pupil template for the original image is performed only for a portion corresponding to the pupil of a portion that has matched with the eye template. This enables reduction in processing time without deteriorating the detection precision.

The contrast correction in this embodiment can also be effectively applied to a technique for determining the eye position other than that described in this embodiment. For example, the contrast correction in this embodiment may be performed when eye position candidates are determined only by the matching using the eye template to determine the final eye position. In this case, also, a significant effect is attained.

In this embodiment, the contrast correction may be omitted.

The eye template and the matching method using the eye template in this embodiment are also effective when adopted independently not in combination with the matching using the pupil template.

(Examples of Other Applications)

The present invention can also be used for applications other than the entrance/exit control system described in this embodiment. For example, the eye position detection algorithm and the iris recognition algorithm according to the present invention may be incorporated as a software module in an apparatus having a camera and a CPU, to provide personal authentication equipment.

Figure 20:
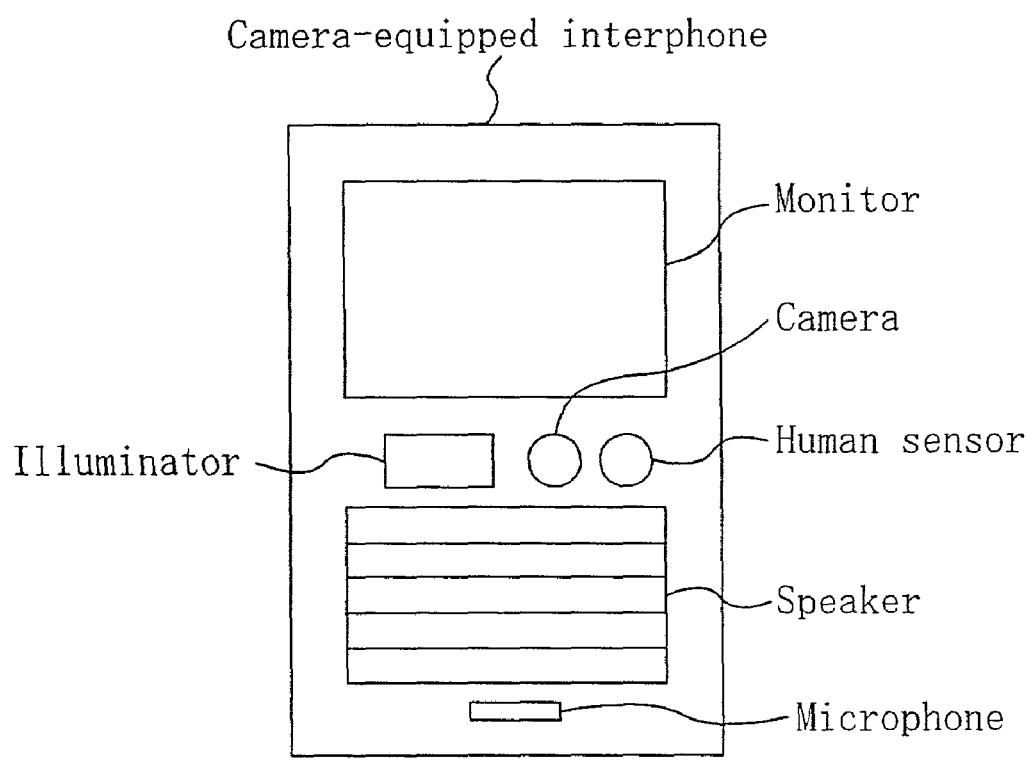
FIG. 20 is a view of a camera-equipped interphone as another application of the present invention.

For example, a camera-equipped interphone including a CPU and a program memory as shown in FIG. 20 can be provided with a personal authentication function by downloading a program by cable or wireless or inputting a program via a memory card. With this function, it is possible to unlock a door by iris recognition or play a response message prepared for a specific visitor.

Figure 21:
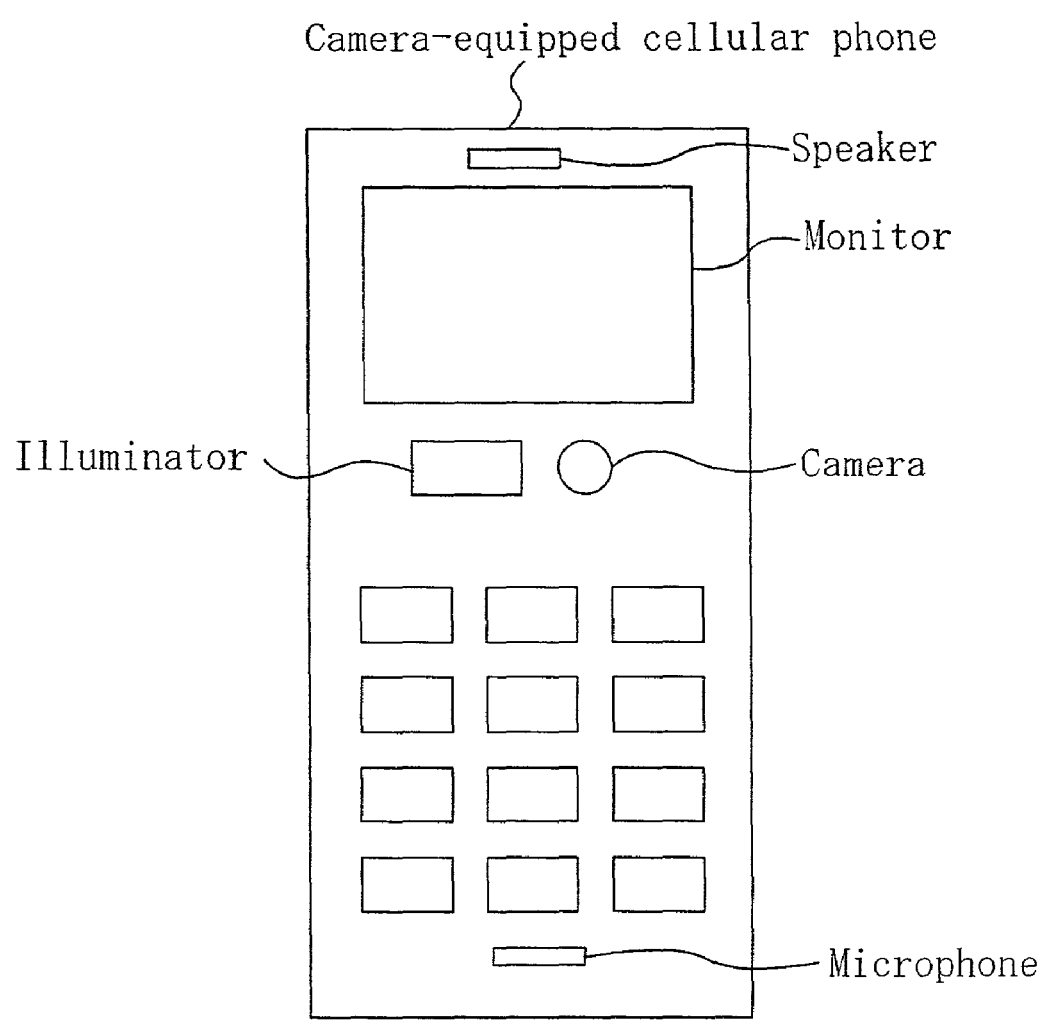
FIG. 21 is a view of a camera-equipped cellular phone as yet another application of the present invention.

As another example, the present invention is applicable to a camera-equipped cellular phone as shown in FIG. 21. Recent cellular phones are provided with a CPU and a memory for connection to the Internet. It is therefore possible to realize a cellular phone provided with the personal authentication function by downloading a program via data communication or inserting a memory card storing a program in a memory card slot. With this function, it is possible to protect the cellular phone against unauthorized use by other persons or realize reliable electronic transaction.

Thus, according to the present invention, the contrast between the sclera portion and iris portion of an eye is stressed before start of matching for detection of the position of the eye, to thereby increase the edge intensity between the sclera portion and the iris portion. This enables high-precision detection of the eye position by the matching between the brightness gradient image and the eye template.

Also, points on the periphery of the iris portion are arranged in n concentric circles in the eye template. With this arrangement, the eye template can meet a variation in eye size that may more or less occur, and thus high-precision matching is possible.

In addition, points on the brightness gradient image corresponding to pixels having a brightness value greater than a predetermined value are excluded from correlation value calculation for matching. This means that a portion overlapped by reflection from an eyeglass, if any, is not included in the correlation value calculation. This enables further high precision matching of the eye position.

Moreover, matching using a pupil template is performed in addition to the matching using an eye template, and the eye position is detected based on matching scores obtained from the two types of matching. This improves the precision of locating the center position of an eye compared with that conventionally achieved.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A method for detecting an eye position from a face image including at least an eye area, the face image being taken under near infrared light, comprising the steps of:
performing brightness correction for part or the entire of the face image to increase the contrast between a sclera portion and an iris portion of the eye;
calculating brightness gradient vectors for the brightness-corrected face image; and
performing matching between a brightness gradient image generated using the calculated brightness gradient vectors and an eye template,
wherein the eye position is detected based on the results of the matching,
wherein the brightness correction step includes the steps of:
calculating a brightness gradient for each pixel in a part of the face image for brightness correction;
generating an expression for conversion for histogram equalization using some of pixels in the part, the some pixels being a top A percent of the pixels in the part ranked according to a brightness gradient intensity where A is a predetermined value; and
performing histogram equalization for all pixels in the part using the generated expression for conversion.

2. The method of claim 1, wherein a correlation between an image size and a filter size, capable of intensifying an edge of the iris portion against the sclera portion is previously calculated, and
the calculation of the brightness gradient in the brightness correction step is performed using a filter having a size determined to correspond to the size of the face image based on the calculated correlation.

3. The method of claim 1, wherein a correlation between an image size and a filter size, capable of intensifying an edge of the iris portion against the sclera portion is previously calculated, and
the calculation of the brightness gradient in the brightness correction step is performed using a filter having a predetermined size and changing the size of the face image to correspond to the filter size based on the calculated correlation.

4. The method of claim 1, wherein the brightness correction step includes the steps of: calculating an average brightness for part or the entire of the face image; and
performing the brightness correction when the calculated average brightness is smaller than a predetermined value while performing no bright correction when it is equal to or greater than the predetermined value.

5. The method of claim 1, wherein the brightness correction step includes the steps of: splitting an area of the face image subjected to the brightness correction into a plurality of partial areas; and
performing the brightness correction for each of the partial areas.

6. The method of claim 5, wherein the splitting of the area includes splitting the area subjected to the brightness correction into right and left parts.

7. The method of claim 6, wherein the splitting of the area includes detecting the position of a nose from the area subjected to the brightness correction, and splitting the area subjected to the brightness correction into right and left parts with respect to the position of the nose.

8. The method of claim 1,
wherein the eye template includes a plurality of points each having a brightness gradient vector, the points being placed on a curve corresponding to the boundary between an eyelid and an eyeball and on the periphery of an iris portion, and
the points placed on the periphery of the iris portion are arranged in n concentric circles (n is an integer equal to or more than 2).

9. The method of claim 1,
wherein in the matching, points on the brightness gradient image corresponding to pixels of the face image having a brightness value greater than a predetermined value are excluded from correlation value calculation for the matching.

10. A device for detecting an eye position from a face image including at least an eye area, the face image being taken under near infrared light, comprising:
means for performing brightness correction for part or the entire of the face image to increase the contrast between a sclera portion and an iris portion of an eye;
means for calculating brightness gradient vectors from the brightness-corrected face image; and
means for performing matching between a brightness gradient image generated using the calculated brightness gradient vectors and an eye template,
wherein the eye position is detected based on the results of the matching,
wherein the brightness correction means performs the steps of:
calculating a brightness gradient for each pixel in a part of the face image for brightness correction;
generating an expression for conversion for histogram equalization using some of pixels in the part, the some pixels being a top A percent of the pixels in the part ranked according to a brightness gradient intensity where A is a predetermined value; and
performing histogram equalization for all pixels in the part using the generated expression for conversion.

11. The device of claim 10,
wherein the eye template includes a plurality of points each having a brightness gradient vector, the points being placed on a curve corresponding to the boundary between an eyelid and an eyeball and on the periphery of an iris portion, and
the points placed on the periphery of the iris portion are arranged in n concentric circles (n is an integer equal to or more than 2).

12. The device of claim 10,
wherein in the matching, points on the brightness gradient image corresponding to pixels of the face image having a brightness value greater than a predetermined value are excluded from correlation value calculation for the matching.

* * * * *